(12) United States Patent  (10) Patent No.: US 7,931,389 B2
Suckle et al.  (45) Date of Patent: Apr. 26, 2011

(54) CORD REEL INCLUDING ONE OR MORE ELECTRICAL DEVICES

(75) Inventors: Mitchell Suckle, Hermosa Beach, CA (US); John Allbright, West Midlands (GB)

(73) Assignee: Belkin International, Inc., Playa Vista, CA (US)

( * ) Notice: Subject to any disclaimer, the term of this patent is extended or adjusted under 35 U.S.C. 154(b) by 826 days.

(21) Appl. No.: 11/874,160

(22) Filed: Oct. 17, 2007

(65) Prior Publication Data

US 2008/0111013 A1  May 15, 2008

Related U.S. Application Data

(60) Provisional application No. 60/852,888, filed on Oct. 18, 2006, provisional application No. 60/852,890, filed on Oct. 18, 2006, provisional application No. 60/853,011, filed on Oct. 18, 2006, provisional application No. 60/852,889, filed on Oct. 18, 2006.

(51) Int. Cl.
*F21V 33/00* (2006.01)

(52) U.S. Cl. ........ 362/253; 362/191; 242/400; 242/405; 248/49

(58) Field of Classification Search ............... 248/49.65; 242/405, 406, 400, 400.1, 405.1, 405.2, 405.3; 362/253, 191, 234
See application file for complete search history.

(56) References Cited

U.S. PATENT DOCUMENTS

| | | | |
|---|---|---|---|
| 3,870,133 A | | 3/1975 | Brennenstuhl |
| 4,282,954 A | | 8/1981 | Hill |
| 4,520,239 A | * | 5/1985 | Schwartz ............ 191/12.4 |
| 5,521,806 A | * | 5/1996 | Hutzel et al. ........... 362/486 |
| 5,590,749 A | | 1/1997 | Wagner et al. |
| 5,629,826 A | | 5/1997 | Roca et al. |
| 5,923,147 A | | 7/1999 | Martensson |
| 6,024,054 A | | 2/2000 | Matt et al. |
| 7,438,258 B2 | * | 10/2008 | Chen ............... 242/614 |
| 2004/0032741 A1 | * | 2/2004 | Tai .................. 362/387 |
| 2006/0138270 A1 | * | 6/2006 | Lichtscheidl et al. ..... 242/396.1 |
| 2006/0162675 A1 | * | 7/2006 | Ghalebi et al. ........... 119/796 |
| 2007/0183146 A1 | * | 8/2007 | Swartfager ............. 362/208 |

FOREIGN PATENT DOCUMENTS

DE  39 16 400  9/1990

(Continued)

OTHER PUBLICATIONS

European Search Report for Application No. 07254136.0; Apr. 17, 2008; 6 pages.

(Continued)

*Primary Examiner* — Laura Tso
(74) *Attorney, Agent, or Firm* — Bryan Cave LLP

(57) ABSTRACT

In a number of embodiments, a cord reel can include: (a) an electrical cable; (b) a casing with a first exterior surface; (c) one or more electrical receptacles at the first exterior surface and electrically coupled to the electrical cable; and (d) a frame. The frame can include: (a) at least one wheel; and (b) a body coupled to the at least one wheel and the casing. In these embodiments, the casing is configured such that at least a portion of the electrical cable can be wound around a first portion of the casing. The electrical cable is configured to provide electrical power to the one or more electrical receptacles. The body can include: (a) a shaft portion with an end; and (b) a handle coupled to the end of the shaft portion. A length of the shaft portion can be adjusted between two or more lengths. Other embodiments are disclosed in this application.

27 Claims, 19 Drawing Sheets

FOREIGN PATENT DOCUMENTS

| | | |
|---|---|---|
| DE | 40 23 690 | 1/1992 |
| DE | 44 05 391 | 9/1994 |
| FR | 1 360 829 | 5/1964 |
| FR | 2 831 341 | 4/2003 |
| NL | 7 312 452 | 3/1974 |

OTHER PUBLICATIONS

Craftsman 30 ft. Cord Reel, Retractable with Incandescent Work Light; http://www.sears.com/sr/javasr/product.do?BV__SessionID=@@@@1459950363.1160757327@@@@&BV__EngineID=ccefaddid...; Oct. 13, 2006; 2 pages.

Consumeraffairs.com; Harbor Freight Tools Recalls Industrial Cord Reel; http://www.consumeraffairs.com/recalls04/harbor_freight.html; Oct. 13, 2006; 4 pages.

DeWalt; Heavy-Duty Worksite Radio/Charger—DC011; http://www.dewalt.com/us/products/tool_detail.asp?productID=8042; 2 pages.

uBid.com; Pit Bull 50 ft Extension Cord Reel; http://www.ubid.com/Pit_Bull_50_Ft_Extension_Cord_Reel/a601722803-researchall.html; Oct. 13, 2006; 5 pages.

* cited by examiner

CORD REEL INCLUDING ONE OR MORE ELECTRICAL DEVICES

CROSS REFERENCE TO RELATED APPLICATIONS

This application is claims priority to: U.S. Provisional Patent Application No. 60/852,888, filed Oct. 18, 2006, titled Electrical Device with Wheel and Handle; U.S. Provisional Patent Application No. 60/852,890, filed Oct. 18, 2006, entitled Electrical Device with Removable Light; U.S. Provisional Patent Application No. 60/853,011, filed Oct. 18, 2006, entitled Electrical Devices With Integrated Light; and U.S. Provisional Patent Application No. 60/852,889, filed Oct. 18, 2006, title Electrical Device with Integrated Radio. This application also incorporated by reference U.S. Provisional Patent Application Nos. 60/852,888, 60/852,890, 60/853,011, and 60/852,889.

FIELD OF THE INVENTION

This invention relates generally to cord reels, and relates more particularly to such cord reels configured to facilitate movement of the cord reel and cord reels including one or more electrical devices and methods of using the same.

DESCRIPTION OF THE BACKGROUND

During construction, repair, and DIY (do-it-yourself) projects, situations occur when a person needs to use electrical tools, such as a portable drill, saw, or the like, an appreciable distance from an electrical outlet. Typically, a person will use an extended electrical cord on a reel to connect the distant point of work with the electrical outlet. However, cord reels can be large, bulky, and heavy and, thus, hard for an average person to move. Additionally, cord reels have a limited number of electrical outlets that limits the number of electrical devices that the person can couple to the cord reel.

Accordingly, a need or potential for benefit exists for a cord reel that allows a user to easily move the cord reel and increase the number of outlets available for use.

BRIEF DESCRIPTION OF THE DRAWINGS

To facilitate further description of the embodiments, the following drawings are provided in which.

Figure 1:
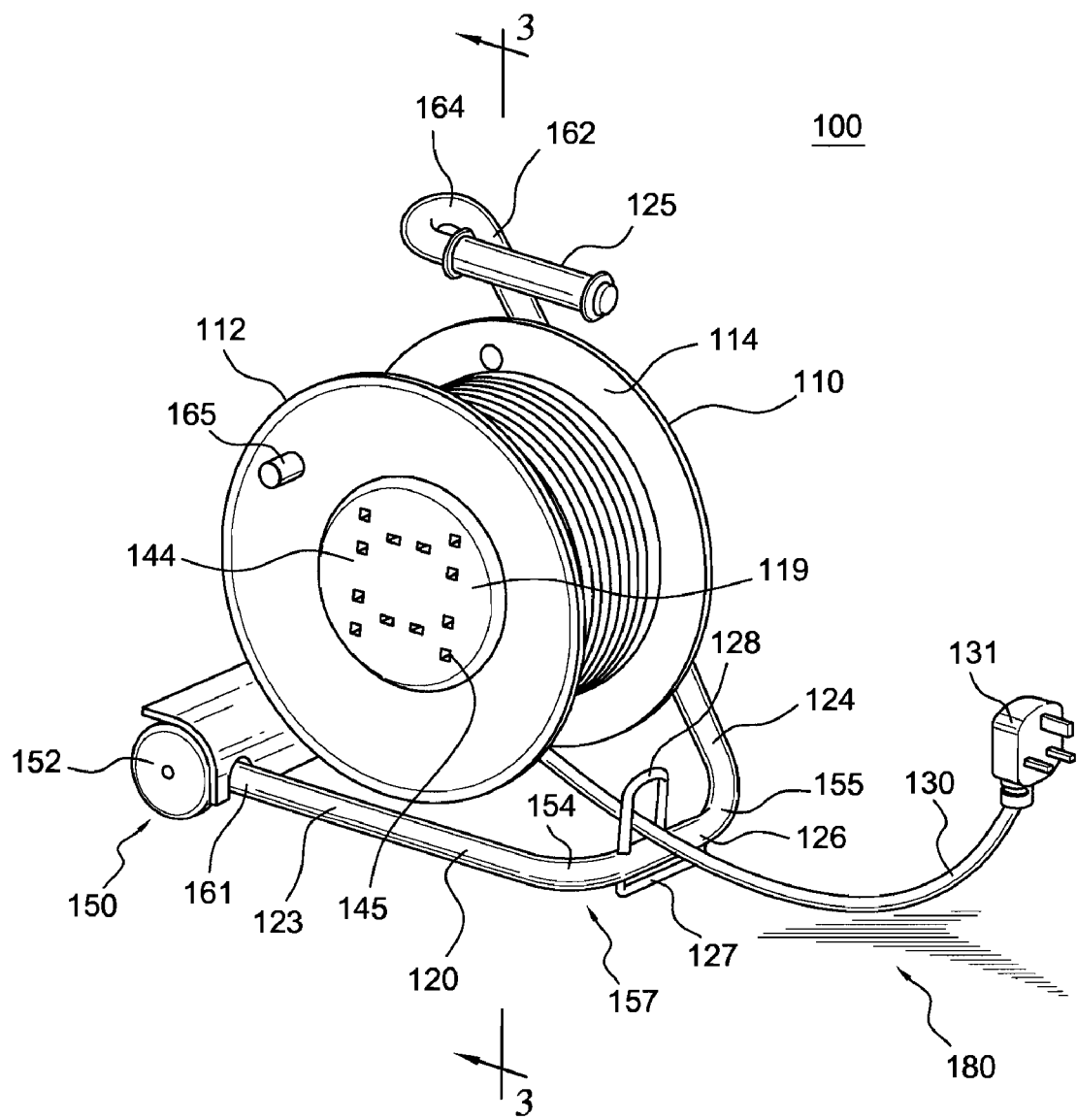
FIG. 1 is a top, front, left isometric view illustrating a cord reel, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "on," as used herein, is defined as on, at, or otherwise adjacent to or next to or over.

The terms "couple," "coupled," "couples," "coupling," and the like should be broadly understood and refer to connecting two or more elements or signals, electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable. For example, the recitation of a casing being coupled to a frame does not mean that the casing cannot be removed (readily or otherwise) from, or that it is permanently connected to, the frame.

DETAILED DESCRIPTION OF EXAMPLES OF EMBODIMENTS

In a number of embodiments, a cord reel can include: (a) an electrical cable; (b) a casing with a first exterior surface; (c) one or more electrical receptacles at the first exterior surface and electrically coupled to the electrical cable; and (d) a frame. The frame can include: (a) at least one wheel; and (b) a body coupled to the at least one wheel and the casing. In these embodiments, the casing is configured such that at least a portion of the electrical cable can be wound around a first portion of the casing. The electrical cable is configured to provide electrical power to the one or more electrical receptacles. The body can include: (a) a shaft portion with an end; and (b) a handle coupled to the end of the shaft portion. A length of the shaft portion can be adjusted between two or more lengths.

In other embodiments, a cord reel can include: (a) an electrical cable; (b) a first light emitting device electrically coupled to the electrical cable; (c) a casing with a first exterior surface and enclosing at least a first portion of the first light emitting device; (d) one or more electrical receptacles at the first exterior surface and electrically coupled to the electrical cable; and (e) a frame coupled to the casing. In these embodiments, the casing is configured such that at least a portion of the electrical cable can be wound around a first portion of the casing. The electrical cable is configured to provide electrical power to the one or more electrical receptacles and the first light emitting device.

In yet another embodiment, a cord reel can include: (a) a cable; (b) a removable light emitting device; (c) a casing configured to contain the removable light emitting device; and (d) a frame coupled to the casing. In these embodiments, the casing is configured such that at least a portion of the electrical cable can be wound around a first portion of the casing.

In further embodiments, a cord reel can include: (a) a radio; (b) an electrical component; (c) an electrical cable electrically coupled to the electrical component and the radio; and (d) a casing configured to enclose the electrical component and at least a portion of the radio. In these embodiments, the casing is configured such that at least a portion of the electrical cable can be wound around a first portion of the casing.

In other embodiments, a method of manufacturing a cord reel can include: (a) providing an electrical cable; (b) providing a casing with a first exterior surface; (c) providing one or more electrical receptacles at the first exterior surface of the casing; (d) electrically coupling the one or more electrical receptacles to the electrical cable; (e) winding at least a portion of the electrical cable around a first portion of the casing; (f) providing at least one wheel; (g) providing a body to include: (1) a shaft portion with an end, a length of the shaft portion can be adjusted between two or more lengths; and (2) a handle coupled to the end of the shaft portion; and (h) coupling to the at least one wheel to the body.

In still other embodiments, a method of manufacturing a cord reel can include: (a) providing an electrical cable; (b) providing a casing with a first exterior surface; (c) providing one or more electrical receptacles at the first exterior surface of the casing; (d) electrically coupling the one or more electrical receptacles to the electrical cable; (e) winding at least a portion of the electrical cable around a first portion of the casing; (f) providing a first light emitting device; (g) electrically coupling the first light emitting device to the electrical cable; (h) enclosing at least a first portion of the first light emitting device in the casing; (i) providing a frame; and (j) coupling the casing to the frame.

In yet even further embodiments, a method of manufacturing a cord reel can include: (a) providing a cable; (b) providing a casing with a first exterior surface; (c) providing one or more electrical receptacles at the first exterior surface of the casing; (d) electrically coupling the one or more electrical receptacles to the electrical cable; (e) winding at least a portion of the electrical cable around a first portion of the casing; (f) providing a radio; (g) enclosing at least a first portion of the radio in the casing; (h) providing a frame; and (i) coupling the casing to the frame.

Figure 2:
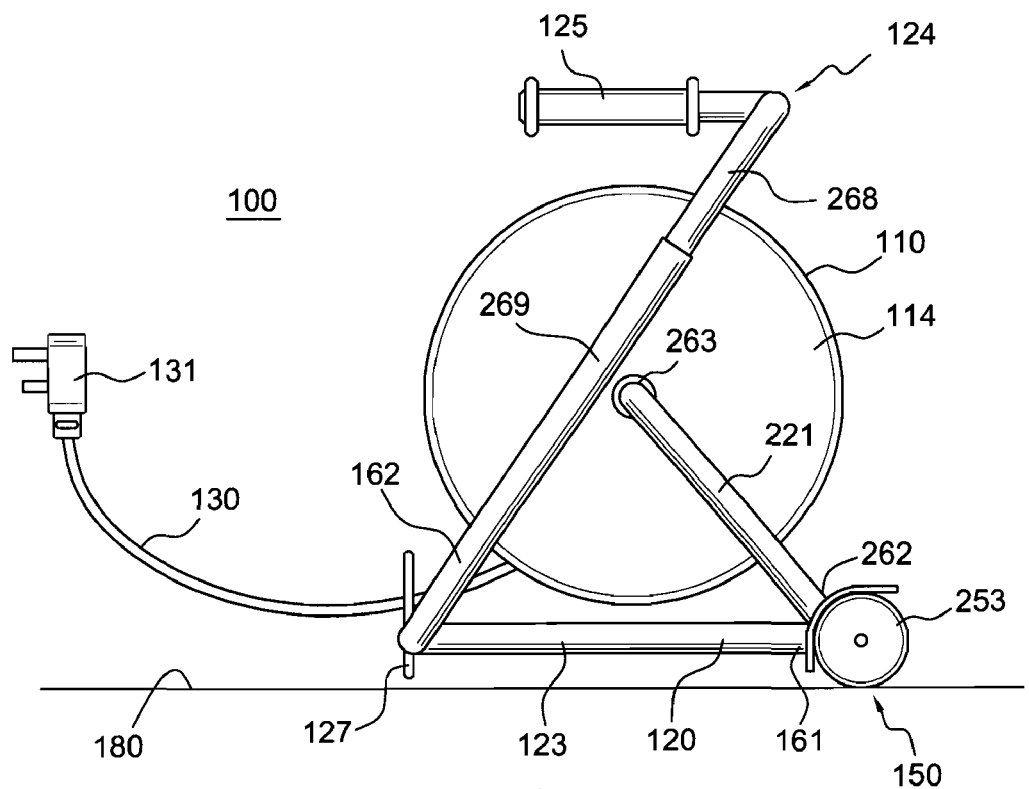
FIG. 2 is a right side view illustrating the cord reel of FIG. 1, according to the first embodiment.
Figure 3:
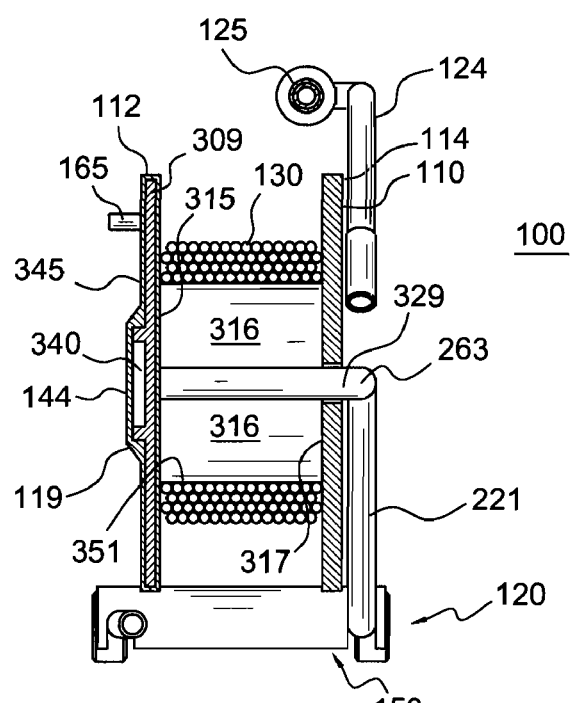
FIG. 3 is a cross-sectional view taken along section lines 3-3 of FIG. 1 illustrating the cord reel of FIG. 1, according to the first embodiment.
Figure 4:
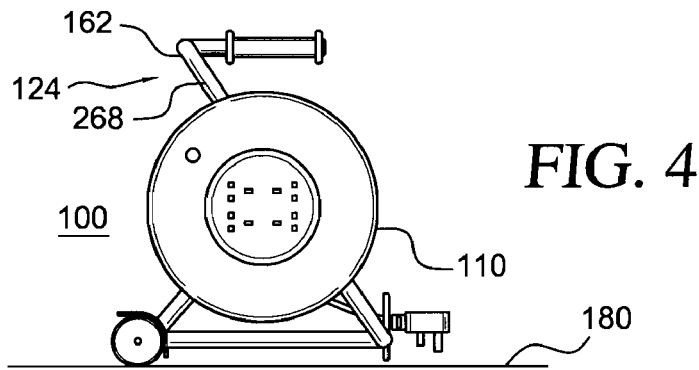
FIG. 4 is a left side view illustrating the cord reel of FIG. 1 with a shaft portion fixed at a first length, according to the first embodiment.

FIG. 1 is a top, front, left isometric view illustrating a cord reel 100, according to a first embodiment. FIG. 2 is a right side view illustrating cord reel 100, according to the first embodiment. FIG. 3 illustrates a cross-sectional view taken along section lines 3-3 of FIG. 1 of cord reel 100, according to the first embodiment. It should be understood that cord reel 100 is merely exemplary and is not limited to the embodiments presented herein. The functional aspects of cord reel 100 can be employed in many different devices or apparatuses not specifically depicted or otherwise described herein.

In some embodiments, an electrical device or cord reel 100 can include: (a) a casing 110 with a first exterior surface; (b) a frame 120; (c) an electrical cable 130 with an electrical plug 131; (d) one or more electrical receptacles 145 in casing 110 and electrically coupled to electrical cable 130.

In some embodiments, casing 110 can be spool-shaped and include: (a) a hub portion 112; (b) a hub portion 114; and (c) a tube section 316 (FIG. 3) with an end 315 (FIG. 3) and an end 317 (FIG. 3) opposite end 315. Tube section 316 couples hub portion 114 to hub portion 112. In some examples, a center section of hub portion 112 is coupled to end 315, and a center section of hub portion 114 is coupled to end 317. In various examples, tube section 316 is cylindrical. In other examples, tube section 316 can have other shapes. In some embodiments, tube section 316 includes grooves (not illustrated) on exterior surface 351 (FIG. 3) for cable 130.

In one embodiment, hub portions 112 and 114 are circular discs. In other embodiments, hub portions 112 and/or 114 can be octagonal, hexagonal, or irregular-shaped discs. In the illustrated embodiment, hub portion 112 is a circular disc with an extension section 119 protruding from an exterior surface 144 of hub portion 112.

In one example, extension section 119 is radially centered on hub portion 112 and can include one or more electrical receptacles 145 on exterior surface 144. In other embodiments, electrical receptacles 145 can be located on any exterior surface of hub portions 112 and/or 114. Preferably, hub portion 112 includes at least two electrical receptacles 145.

In some embodiments, hub portion 112 can also include a hollow interior section 309 (FIG. 3), which is capable of containing or enclosing, partially or entirely, at least one electrical component 340 (FIG. 3). In other embodiments, electrical component 340 can be enclosed in hub portion 114 and/or tube section 316. Electrical component 340 can be coupled to electrical receptacles 145. Electrical power to electrical component 340 can be provided by cable 130. In one example, hub portion 112 includes one or more apertures (not illustrated) through which cable 130 is coupled to electrical component 340.

In the illustrated example, electrical component 340 includes an electrical surge protector. The surge protector is located within the casing and electrically coupled between the one or more electrical receptacles and the electrical cable. In a different embodiment, electrical component 340 can be a rechargeable battery electrically coupled to electrical receptacles 145 and electrical cable 130.

In other embodiments, hollow interior section 309 can include one or more second electrical components in addition to or instead of electrical component 340. For example, hollow interior section 309 can also enclose a clock, a radio, a compact disk player, one or more light emitting devices, a security system, a voltmeter, an ammeter, a multimeter, an uninterruptible power supply (UPS), and/or a thermometer. In a further embodiment, a portion of the second electrical components can be enclosed in hub portion 114, tube section 316, and/or frame 120.

In an embodiment where the at least one of the one or more second electrical components includes a rechargeable battery, the rechargeable battery can be used to power electrical components 340 and/or one or more of the other second electrical devices, and/or any electrical devices (not illustrated) electrically coupled to electrical receptacles 145. The rechargeable battery can be recharged by plugging electrical plug 131 or another electrical plug coupled to the at least one other electrical component (not shown) into an external power source.

In a non-illustrated embodiment, casing 110 is enclosed in a housing to cover cable 130, which is wound around tube section 316. The housing includes an opening (not illustrated) to allow cable 130 to exit the housing. In this embodiment, electrical component 340 also might not be encased in hollow interior section 309, but can be enclosed by or extend from the housing.

In one embodiment, casing 110 is mounted on frame 120. It should be emphasized that frame 120 is merely exemplary and is not limited to the examples presented herein. Frame 120 can be employed in many different configurations or designs not specifically depicted herein.

In the example illustrated in FIGS. 1-3, frame 120 includes a body 157 and a wheel assembly 150. Body 157 can include frame sections 123, 124, 126, 127, 128, 221 (FIG. 2), and 329 (FIG. 3). Frame section 123 can be coupled to wheel assembly 150 at end 161, and frame section 221 can be coupled to wheel assembly 150 at end 262. Frame section 221 extends away from wheel assembly 150 and can be coupled to frame section 329 at end 263 and at a radially centered point of hub portion 114.

Frame section 329 extends through an opening in hub portion 114 into tube section 316. In one example, frame section 329 forms an axis around which casing 110 can be rotated. That is, casing 110 can be rotated in a first direction (e.g. counter clockwise) around frame section 329 to wrap cable 130 around tube section 316, and cable 130 can be unwound from tube section 316 by rotating casing 110 in a second direction (e.g. clockwise) around frame section 329.

Hub portion 112 can include at least one handle 165 to allow a person to manually rotate casing 110 around frame section 329. In other embodiments, instead of a manual winding system, cord reel 100 can include an automatic system (not illustrated) for winding cable 130. For example, cord reel 100 could include a button that when depressed causes cable 130 to automatically wind around tube section 316.

In some embodiments, casing 110 is secured to frame 120 such that casing 110 cannot slide off or be removed from frame section 329. In other embodiments, casing 110 is configured to be removable from frame 120.

In the same or a different embodiment, casing 110 can be configured such that extension section 119 remain substantially stationary while the rest of casing 110 rotates around frame section 329. In some embodiments, electrical receptacles 145 are substantially stationary while cable 130 is wound and unwound around tube section 306.

As shown in FIG. 1, frame section 123 can extend from wheel assembly 150 to the front of cord reel 100 with frame section 123 coupled to frame section 126 at end 154. Frame section 126 can extend across the front side of cord reel 100 and be coupled to frame section 124 at end 155.

In some examples, the bottom of frame section 126 can also be coupled to frame section 127. Frame section 127 abuts surface or ground 180 and acts as a stop for wheel assembly 150. In other embodiment, frame section 127 is replaced with a second wheel assembly. In this embodiment, one or both of the wheel assemblies can include a breaking mechanism to stop the unwanted rolling of cord reel 100.

The top portion of frame section 126 can also be coupled to frame section 128 in one embodiment. Frame section 128 can act as a stop mechanism for the winding process of cable 130. That is, for example, when cable 130 is being wound, electrical plug 131 cannot pass through the opening in frame section 128 because the opening is smaller than electrical plug 131 so the winding process must stop when electrical plug 131 reaches frame section 128.

In the same or a different embodiment, frame section 124 extends, in the vertical direction, away from frame section 126 and towards wheel assembly 150 at an angle with respect to frame section 126. For example, frame section 124 can vertically extend away from frame section 126 at a thirty, forty-five, or sixty degree angle.

Figure 5:
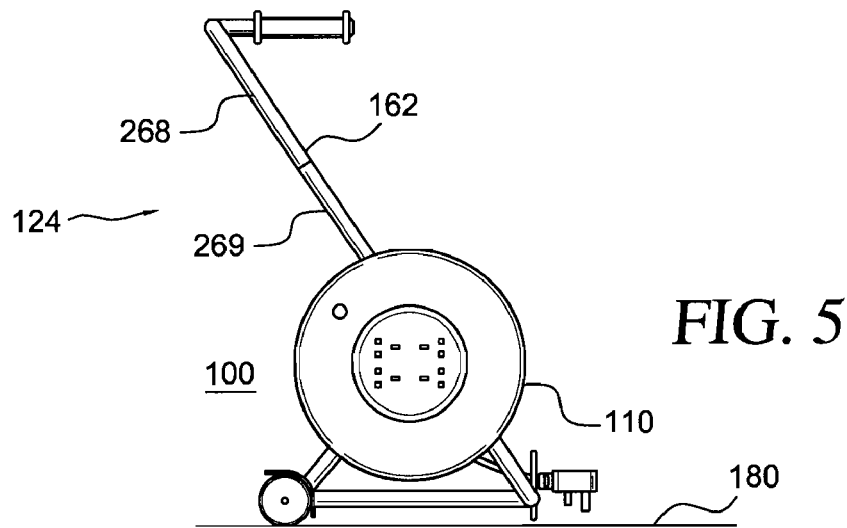
FIG. 5 is a left side view illustrating the cord reel of FIG. 1 with the shaft portion fixed at a second length, according to the first embodiment.
Figure 6:
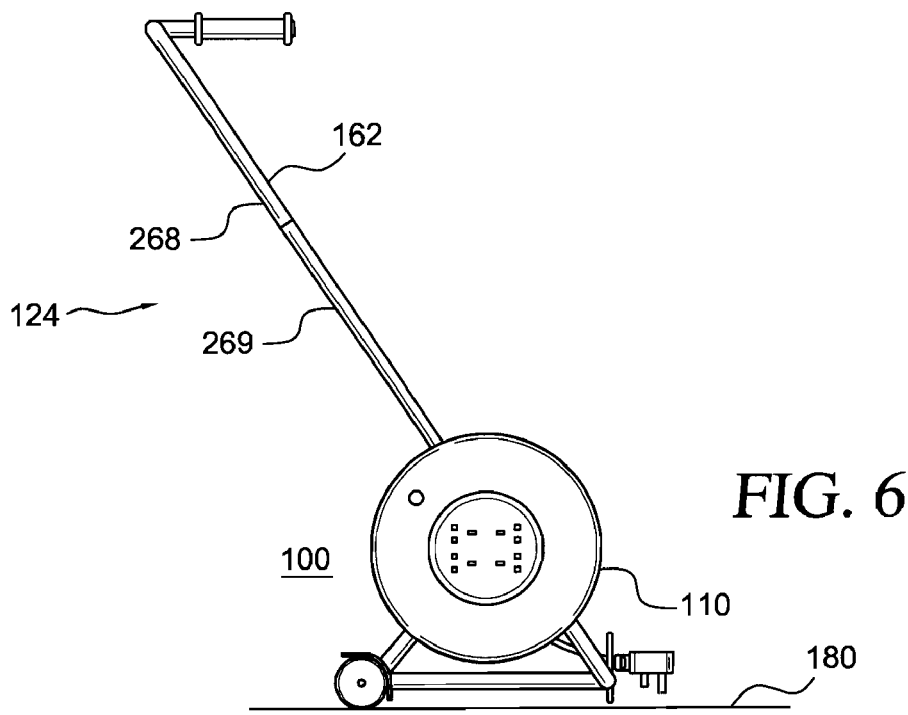
FIG. 6 is a left side view illustrating the cord reel of FIG. 1 with the shaft portion fixed at a third length, according to the first embodiment.
Figure 7:
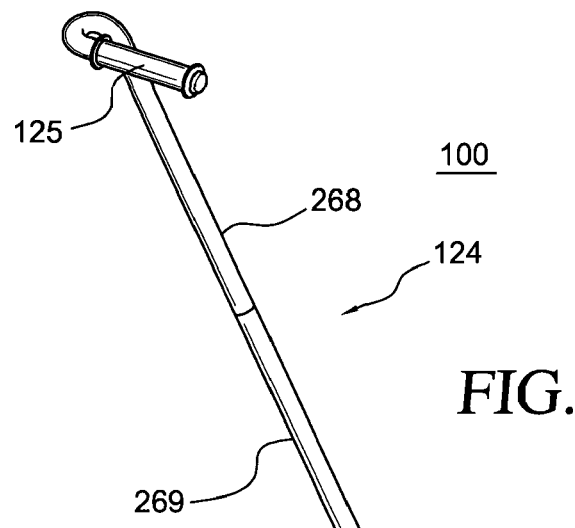
FIG. 7 is a top, front, left isometric view illustrating the cord reel of FIG. 1 with the shaft portion of FIG. 4 fixed at a third length, according to the first embodiment.
Figure 8:
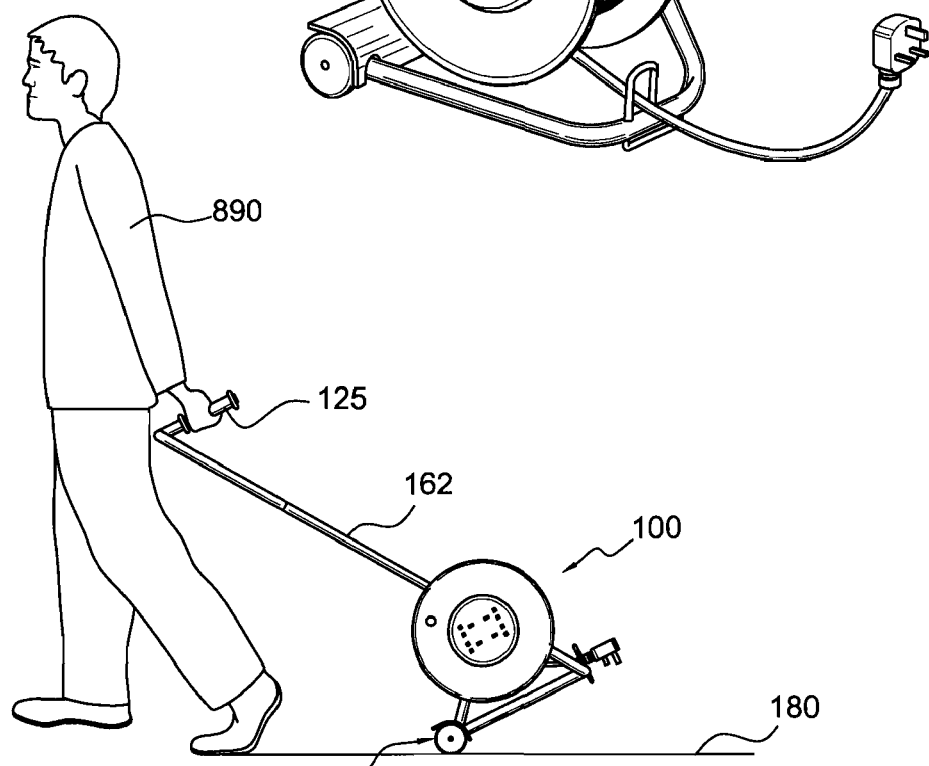
FIG. 8 is a left side view illustrating the cord reel of FIG. 1 being moved, according to the first embodiment.

Frame section 124 can include a shaft portion 162 with a handle 125 at end 164. The length of shaft portion 162 is not fixed, and the length can be adjusted between two or more fixed lengths. FIGS. 5, 6, and 7 illustrate multiple left side views of cord reel 100 with shaft portion 162 fixed at a first, a second, and a third length, respectively, according to the first embodiment. FIG. 8 illustrates an isometric view of cord reel 100 with shaft portion 162 at the third length, according to the first embodiment.

In one example, shaft portion 162 can include two or more telescoping tubular members 268 and 269, as shown in FIGS. 2, and 4-7. Telescoping tubular members 268 and 269 are axially displaceable relative to one another to adjust the overall length of shaft portion 162. Telescoping tubular members 268 and 269 can include radial, axially aligned openings (not shown). A spring loaded plunger (not shown) on telescoping tubular member 268 can enter an opening on telescoping tubular member 269 to lock telescoping tubular members 268 and 269 in a position. The plunger can be depressed and telescoping tubular members 268 and 269 can be moved axially until a desired length is reached. The plunger can then enter into another opening on telescoping tubular member 269 to lock telescoping tubular members 268 and 269 at the desired length. In other examples, shaft portion 162 can include a different number of telescoping tubular members.

In other embodiments, other method or devices can be used to adjust the overall length of shaft portion 162 and to lock the shaft at a give length. For example, in a different embodiment, shaft portion 162 can be foldable into one or more segments or can be separated into one or more segments from the rest of frame 120.

In one embodiment, handle 125 is parallel to ground 180 in a direction substantially perpendicular to the axis of the wheels in wheel assembly 150. In other embodiments, handle 125 can be at other angles in relation to ground 180 and/or to wheel assembly 150. For example, handle 125 can be substantially parallel to the axis of the wheels in wheel assembly 150. Additionally, handle 125 can include a rubberized or plastic coating to increase gripability and comfort.

In one embodiment, wheel assembly 150 includes wheels 152 and 253. Wheels 152 and 253 can be located at ends 161 and 262 of wheel assembly 150, respectively. In other embodiments, wheel assembly 150 includes one wheel or three or more wheels. As an example, the one wheel can be an elongated cylinder. In a non-illustrated embodiment, wheels 152 and 253 can be replaced with one or more low friction pads or the like.

Wheel assembly 150 combined with the extendibility of shaft portion 162 permits a person to move cord reel 100 between locations without having to carry cord reel 100. FIG. 8 is a left side view illustrating cord reel 100 being moved, according to the first embodiment.

In the embodiment illustrated in FIG. 8, cord reel 100 is tilted at an angle such that the only portion of cord reel 100 in contact with ground 180 is wheel assembly 150. Shaft portion 162 is extended to allow user 890 to comfortably grip handle 125 and pull cord reel 100 behind his body.

Referring back to FIGS. 1-3, hub portions 112 and 114, and tube section 316 can be formed of a plastic material such as polyethylene so as to be lightweight, strong, and inexpensive to produce. In some embodiments, hub portions 112 and 114, and tube section 316 are integrally formed. In other embodiments, casing 110 can be formed of a metal.

Frame 120 can be formed of a light-weight and strong metal such as aluminum. If a stronger frame is needed, frame 120 can be formed of steel and/or titanium. In other embodiments, frame 120 is formed using a plastic.

In one embodiment, cable 130 is an electrical cable. In other embodiments, cable 130 can be any type of wire that can be spooled. For example, cable 130 can be Ethernet, optical, or telephone cable. In some embodiments, cable 130 is not coupled to electrical component 340. In these embodiments, electrical component 340 can operate using power from a rechargeable battery or another power source contained within cord reel 100 when electrical plug 131 is not coupled to a power source. In the same or a different embodiment, electrical receptacles 145 can be located on cable 130.

Figure 9:
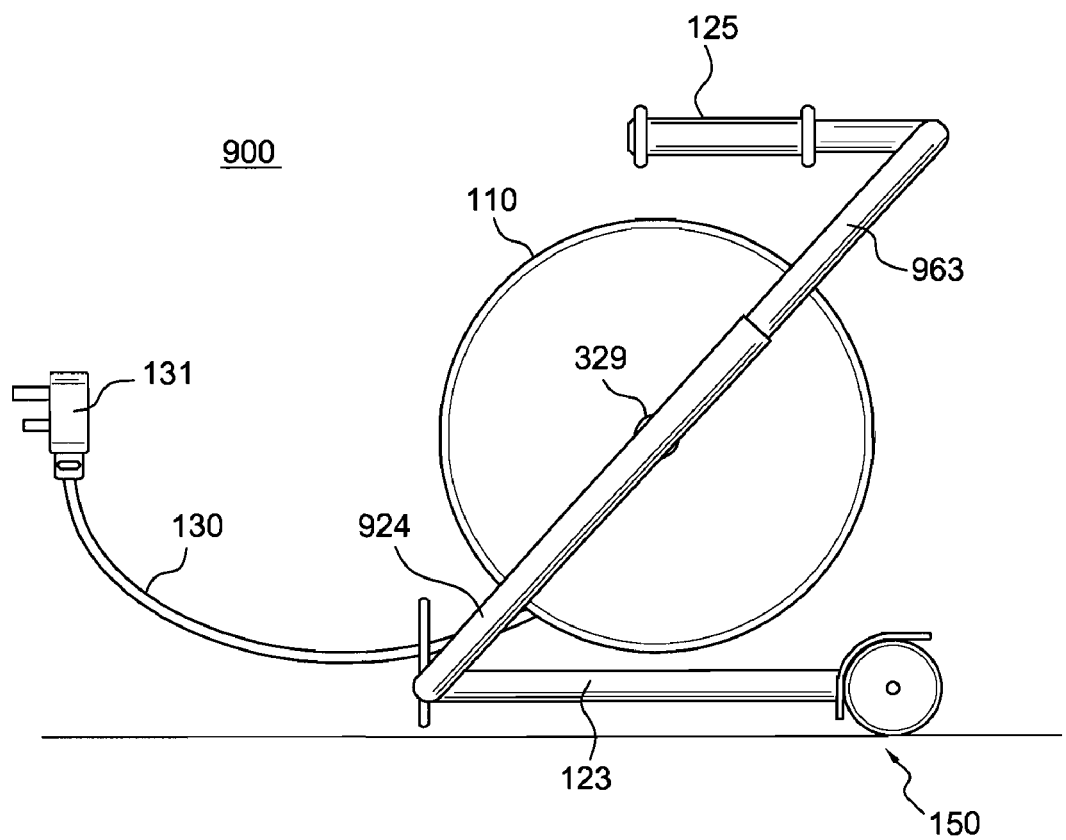
FIG. 9 is a right side view illustrating a cord reel, according to a second embodiment.

FIG. 9 is a right side view illustrating a cord reel 900, according to a second embodiment. In this embodiment, frame section 924 is coupled to frame sections 123 and 329, and frame section 221 (FIG. 2) is eliminated. Frame section 924 can include an expandable shaft portion 963 similar to shaft portion 162. Eliminating frame section 221 (FIG. 2) and using the frame configuration shown in FIG. 9 can reduce the costs of manufacturing cord reel 900.

Figure 10:
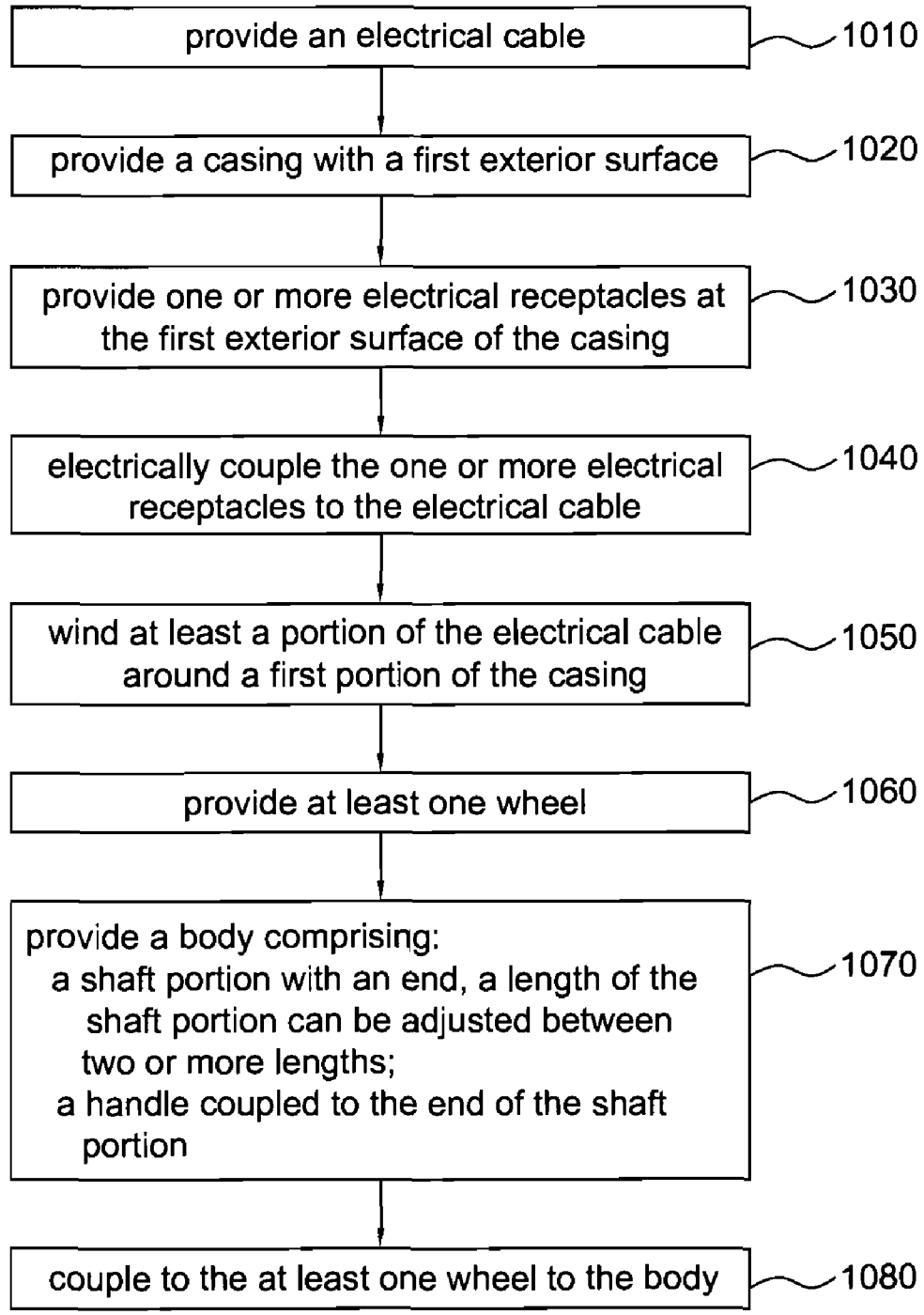
FIG. 10 is a flow chart illustrating an embodiment of a method of manufacturing a cord reel.

FIG. 10 is a flow chart 1000 illustrating an embodiment of a method of manufacturing a cord reel. Flow chart 1000 of FIG. 10 includes a step 1010 of providing an electrical cable. As an example, the cable can be identical or similar to cable 130 of FIG. 1.

Flow chart 1000 of FIG. 10 continues with a step 1020 of providing a casing with a first exterior surface. As an example, the casing and first exterior surface can be identical or similar to casing 110 and exterior surface 144, respectively, of FIG. 1.

Subsequently, flow chart 1000 of FIG. 10 includes a step 1030 of providing one or more electrical receptacles at the first exterior surface of the casing. As an example, the one or more electrical receptacles can be identical or similar to electrical receptacles 145 of FIG. 1.

Next, flow chart 1000 includes a step 1040 of electrically coupling the one or more electrical receptacles to the electrical cable. The one or more electrical receptacles can be coupled to the electrical cable identical or similar to the coupling of electrical receptacles 145 to electrical cable 130.

Flow chart 1000 of FIG. 10 continues with a step 1050 of winding at least a portion of the electrical cable around a first portion of the casing. As an example, a portion of the cable wound around a first portion of the casing can be identical or similar to the portion of cable 130 wound around tube section 316 as illustrated in FIG. 3.

Flow chart 1000 of FIG. 10 continues with a step 1060 of providing at least one wheel. The at least one wheel can be identical or similar to wheels 152 and/or 253 as illustrated in FIGS. 1 and 2, respectively.

Subsequently, flow chart 1000 of FIG. 10 includes a step 1070 of providing a body including: (a) a shaft portion with an end and configured such that a length of the shaft portion can be adjusted between two or more lengths; and (b) a handle coupled to the end of the shaft portion. As an example, the body, the shaft portion, and the handle can be identical to or similar to body 157, shaft portion 262, and handle 125 as illustrated in FIG. 2.

Next, flow chart 1000 includes a step 1080 of coupling to the at least one wheel to the body. As an example, the coupling of the at least one wheel to the body can be identical or similar to the coupling of wheels 152 and 253 to body 157 as shown in FIGS. 1 and 2.

Figure 11:
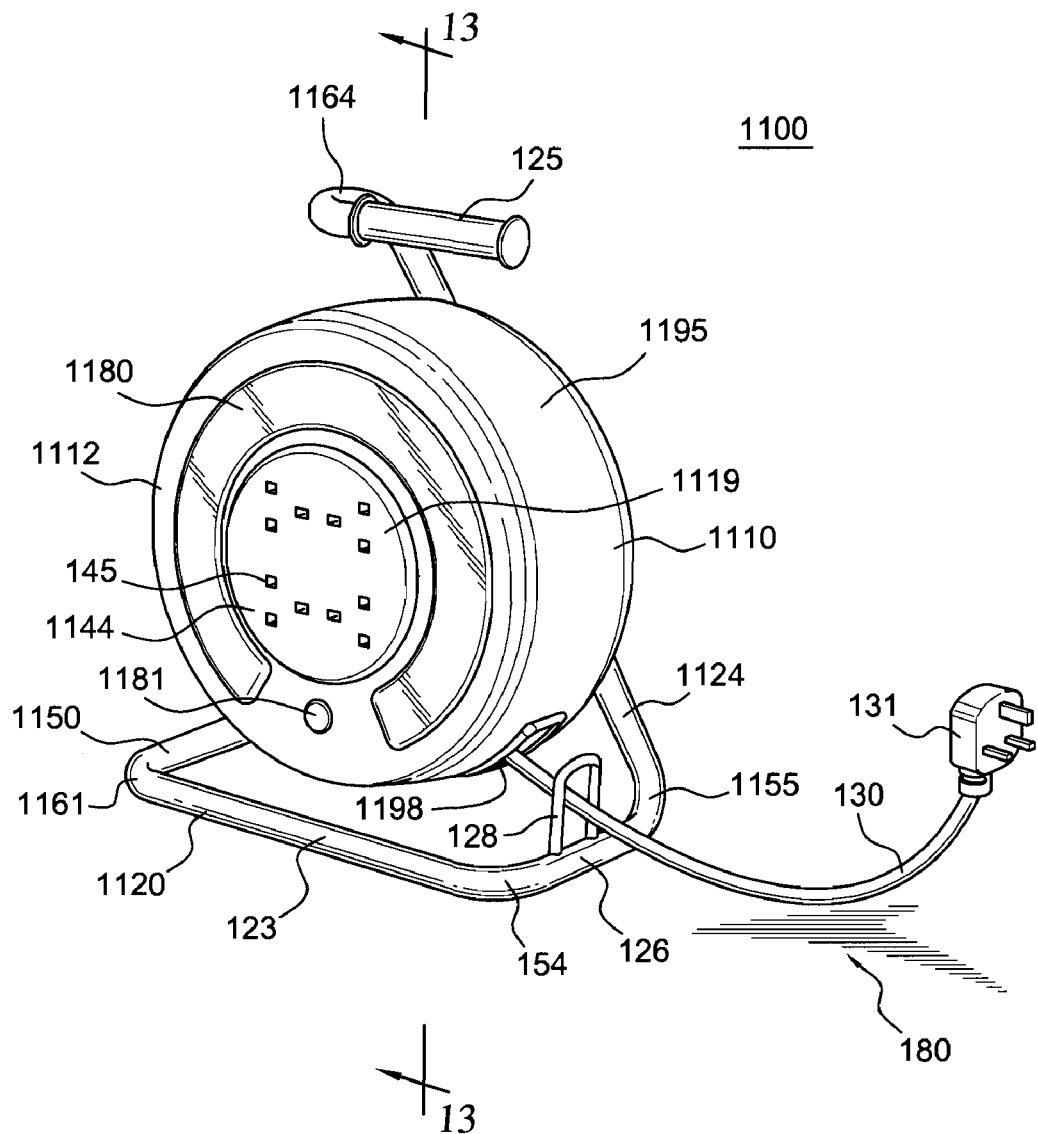
FIG. 11 is a top, front, left isometric view illustrating a cord reel, according to a third embodiment.
Figure 12:
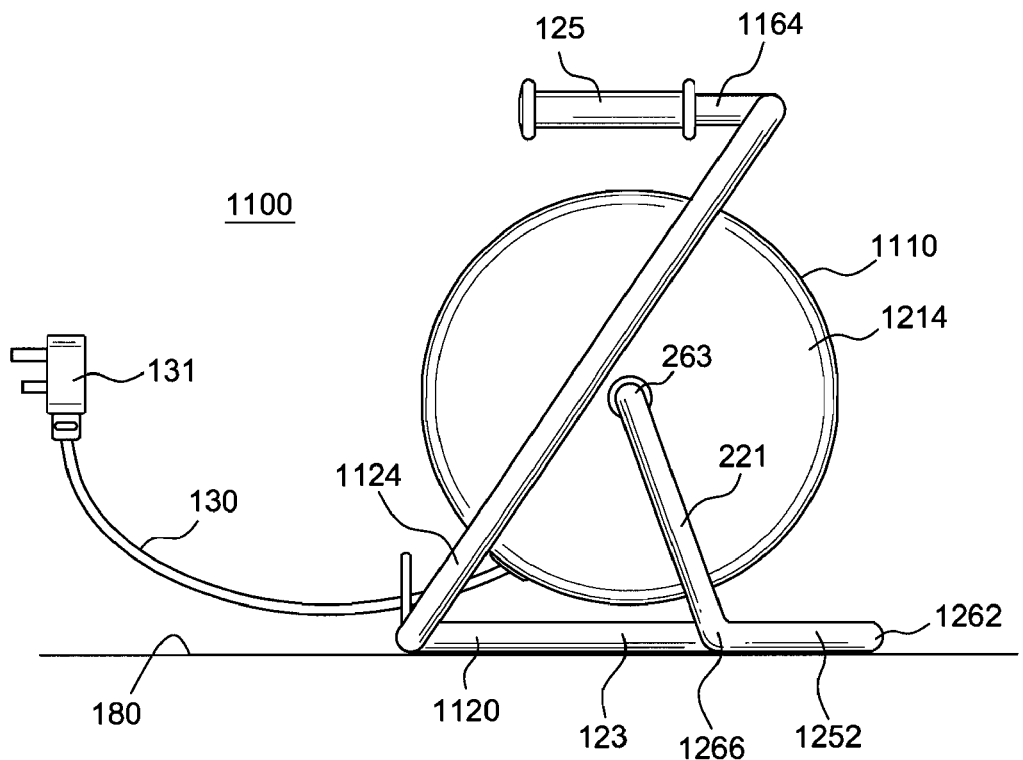
FIG. 12 is a right side view illustrating the cord reel of FIG. 11, according to the third embodiment.
Figure 13:
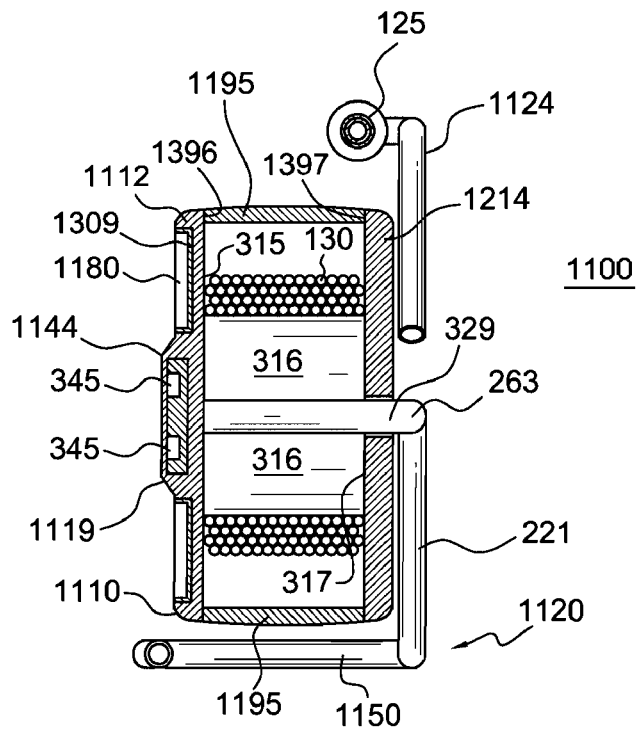
FIG. 13 is a cross-sectional view taken along section lines 13-13 of FIG. 11 illustrating the cord reel of FIG. 1, according to the third embodiment.
Figure 14:
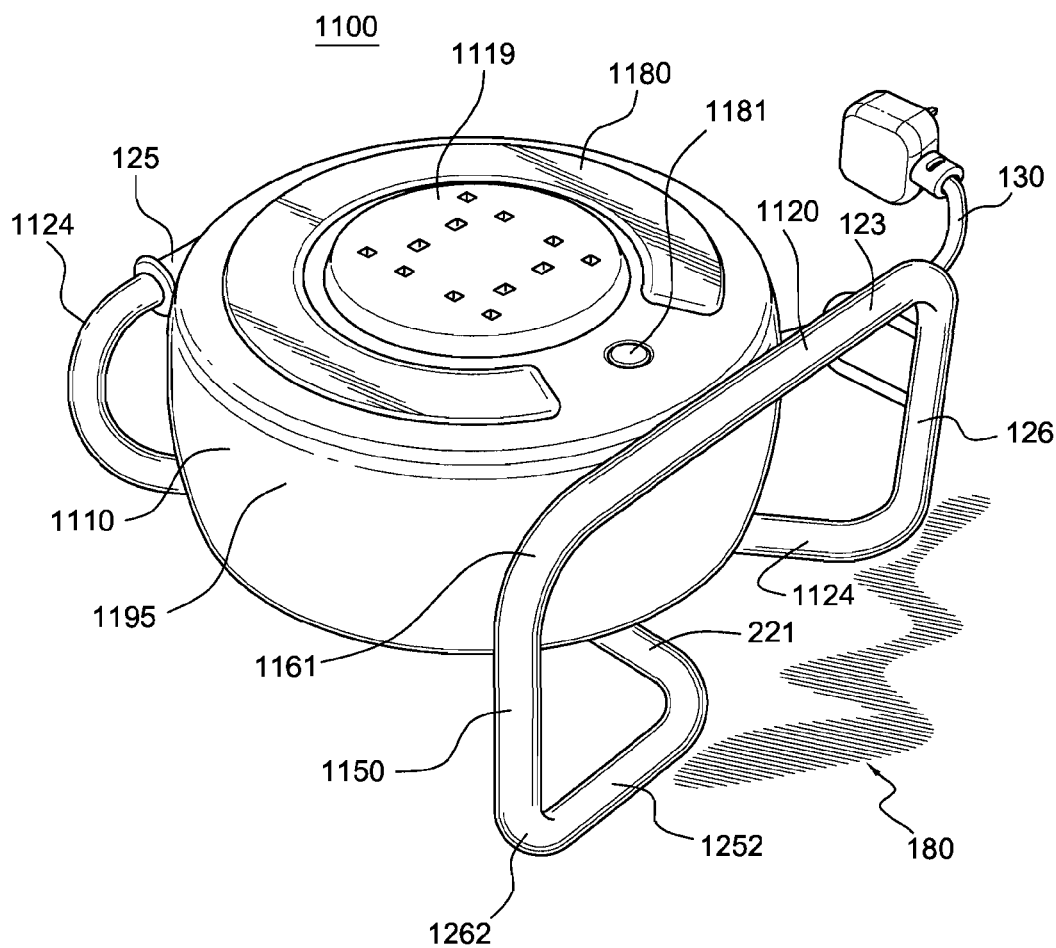
FIG. 14 is a back, left, bottom isometric view illustrating the cord reel of FIG. 1, according to the third embodiment.

FIG. 11 is a top, front, left isometric view illustrating a cord reel 1100, according to a third embodiment. FIG. 12 is a right side view illustrating cord reel 1100, according to the third embodiment. FIG. 13 is a cross-sectional view taken along section lines 13-13 of FIG. 11 illustrating cord reel 1100, according to the third embodiment. FIG. 14 is a back, left, bottom isometric view illustrating cord reel 1100, according to the third embodiment. It should be understood that cord reel 1100 is merely exemplary and is not limited to the embodiments presented herein. The functional aspects of cord reel 1100 can be employed in many different devices or apparatuses not specifically depicted or otherwise described herein.

Cord reel 1100 can include: (a) a casing 1110; (b) a frame 1120; (c) at least one light emitting device 1180; and (d) cable 130 with electrical plug 131. In some embodiments, casing 110 can include: (a) hub portion 1112; (b) hub portion 1214 (FIG. 12); (c) tube section 316 (FIG. 13) with end 315 (FIG. 13) and end 317 (FIG. 13) opposite end 315; and (d) a housing 1195.

In one example, tube section 316 is enclosed by housing 1195 and hub portions 1112 and 114. Housing 1195 is coupled to an interior end 1396 (FIG. 13) at a radial edge of hub portion 1112 and to an interior end 1397 (FIG. 13) at a radial edge of hub portion 1214. In one embodiment, all or a part of housing 1195 can be integrated with hub portion 1112 and/or hub portion 114. Housing 1195 includes an opening 1198 to allow cable 130 to exit housing 1195.

In one example, extension section 1119 is radially centered on hub portion 1112 and can include one or more electrical receptacles 145 on an exterior surface 1144. In other embodiments, electrical receptacles 145 can be located at any exterior surface of housing 1195 and/or hub portions 1112 and 1214. Preferably, hub portion 1112 includes at least two electrical receptacles 145.

Hollow interior section 309 (FIG. 13) can partially or completely encloses light emitting device 1180. In the illustrated embodiment, light emitting device 1180 protrudes from casing 1110 at surface 1144 with a power switch or button 1181 located at the bottom portion of exterior surface 1144. In one example, the light projected from light emitting device 1180 and/or light emitting device 1180 itself can be U-shaped. In other examples, the light projected from light emitting device 1180 and/or light emitting device 1180 itself can have a circular, ring, square, irregular, or other shape.

In a different embodiment, one or more electrical receptacles 145 can be located at surface 1144 and light emitting device 1180 can protrude from exterior surface 1144. In yet another embodiment, light emitting device 1180, and electrical receptacles 145 can be located at housing 1195 and/or hub portion 114. In a further embodiment, light emitting device 1180 and electrical receptacles 145 can be located at one or more surfaces of housing 1195, hub portion 1112, and/or hub portion 114.

In some of the embodiments, casing 1110 can have one or more lights, such as light emitting device 1180, and each of the lights can work independently of each other. For example, each light emitting device 1180 can have a separate power button or switch. In some embodiments, light emitting device 1180 emits directed or focused light (e.g. a spotlight or a flashlight) and in other embodiments, light emitting device 1180 can emit a generally unfocused light useful for illuminating a large area.

In some embodiments, cord reel 1100 can also include a rechargeable battery (not shown). The rechargeable battery can be used to power light emitting device 1180 and/or any electrical devices (not illustrated) electrically coupled to electrical receptacles 145. The rechargeable battery can be recharged by plugging electrical plug 131 or another electrical plug coupled to the at least one other electrical component (not shown) into an electrical outlet.

In some examples, portions of light emitting device 1180 can be enclosed in hub portion 114, tube section 316, and/or frame 1120. Light emitting device 1180 also might not be encased in hollow interior section 309, but can be enclosed by, extend from, or separably attached to housing 1195.

In some embodiments, light emitting device 1180 includes one or more light emitting diodes (LEDs). In other embodiments, light emitting device 1180 includes incandescent or fluorescent light sources. Electrical power to electrical component 340 and light emitting device 1180 can be provided by cable 130. In one example, hub portion 1112 includes one or more apertures (not illustrated) through which cable 130 is coupled to electrical component 340 and light emitting device 1180.

In one embodiment, casing 1110 is mounted on frame 1120. It should be emphasized that frame 1120 is merely exemplary and is not limited to the examples presented herein. Frame 1120 can be employed in many different configurations or designs not specifically depicted herein.

In example shown in FIGS. 11-13, frame 1120 includes frame sections 123, 1124, 126, 128, 1150, 1252, 221, and 329. Frame 1120 is designed and configured such that cord reel 1100 can stably rest on ground 180 at two different orientations. As shown in FIGS. 11 and 12, frame sections 123, 126, 1150, and 1252 can support cord reel 1100 and, as illustrated in FIG. 14, frame sections 1124, 1252, and 221 can also stable support cord reel 100.

Referring again to FIGS. 11-14, frame section 329 extends through an opening at a radially centered point of hub portion 1214 into tube section 316. In one example, frame section 329 forms an axis around which casing 1110 can be rotated. That is, casing 1110 can be rotated around frame section 329 in a first direction (i.e., counter-clockwise) around frame section 329 to wrap cable 130 around tube section 316, and cable 130 can be unwound from tube section 316 by rotating casing 1110 around frame section 329 in a second direction (i.e., clockwise) around frame section 329.

Cord reel 1100 can include an automatic system (not illustrated) for winding cable 130. For example, cord reel 1100 could include a button (not illustrated) that when depressed causes cable 130 to automatically wind around tube section 316. In other embodiments, hub portion 1112 can include at least one handle to allow a person to manually rotate casing 1110 around frame section 329.

In some embodiments, casing 1110 is secured to frame 1120 such that casing 1110 cannot slide off or be removed from frame section 329. In the same or a different embodiment, casing 1110 can be designed such that extension sections 119 and/or light emitting device 1180 remain substantially stationary while the rest of casing 1110 rotates around frame section 329. In some embodiments, electrical receptacles 145 and/or light emitting device 1180 are substantially stationary while cable 130 is wound and unwound around tube section 306.

Frame section 329 can be coupled to frame section 221 at an end 263. Frame section 221 extends away from tube section 316 and is coupled with frame section 1252 at end 1266 (FIG. 12). Frame section 1252 can be coupled to frame section 1150 at end 1262 (FIG. 12). Frame section 1150 can extend across the rear side of cord reel 1100 and be coupled to frame section 123 at end 1161.

As shown in FIG. 11, frame section 123 can extend from frame section 1150 to the front of cord reel 1100. Frame section 123 can be coupled to frame section 126 at end 154. Frame section 126 can extend across the front side of cord reel 1100 and be coupled to frame section 1124 at end 1155.

In the same or a different embodiment, frame section 1124 extends, in the vertical direction, away from frame section 126 and towards frame section 1150 at an angle with respect to frame section 126. For example, frame section 1124 can vertically extend away from frame section 126 at a thirty, forty-five, or sixty degree angle.

Frame section 1124 can include handle 125 at end 1164. In one embodiment, handle 125 is parallel to ground 180 in a direction substantially perpendicular to frame section 1150. In other embodiments, handle 125 can be at other angles in relation to ground 180 and/or to frame section 1150. For example, handle 125 can be substantially parallel to the axis of frame section 1150.

In some embodiments, cable 130 is not coupled to electrical component 340 or light emitting device 1180. In these embodiments, electrical component 340 and light emitting device 1180 can operate using power from a rechargeable battery or another power source contained within cord reel 1100 when electrical plug 131 is not coupled to a power source.

Figure 15:
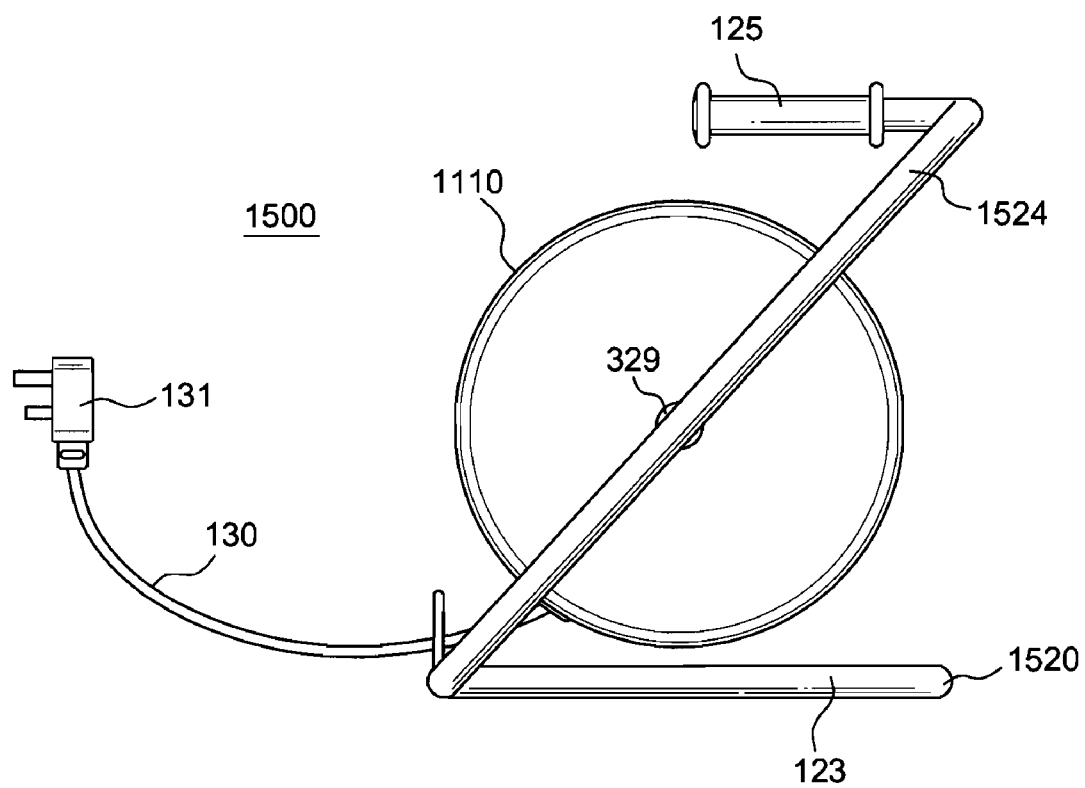
FIG. 15 is a right side view illustrating a cord reel, according to a fourth embodiment.

FIG. 15 is a right side view illustrating an electrical device 1500, according to a fourth embodiment. In this embodiment, frame section 1524 is coupled to frame sections 329 and 126 (FIGS. 11), and frame section 221 (FIG. 12) is eliminated. Eliminating frame section 221 (FIG. 12) and using the frame configuration shown in FIG. 15 can reduce the costs of manufacturing electrical device 1500.

Figure 16:
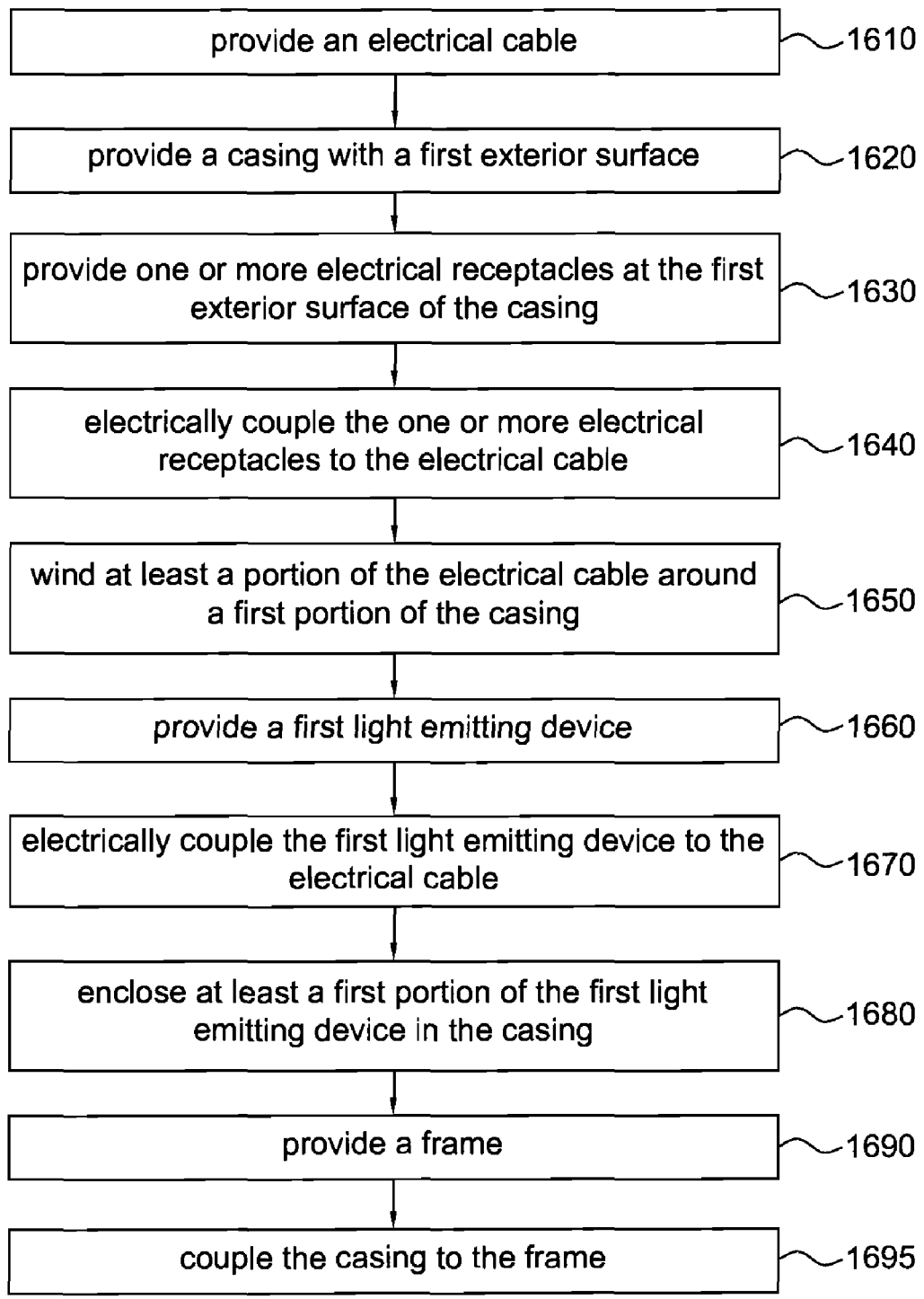
FIG. 16 is a flow chart illustrating an embodiment of a method of manufacturing a cord reel.

FIG. 16 is a flow chart 1600 illustrating an embodiment of a method of manufacturing a cord reel. Flow chart 1600 of FIG. 16 includes a step 1610 of providing an electrical cable. As an example, the cable can be identical or similar to cable 130 of FIG. 11.

Flow chart 1600 of FIG. 16 continues with a step 1620 of providing a casing with a first exterior surface. As an example, the casing and first exterior surface can be identical or similar to casing 1110 and exterior surface 1144, respectively, of FIG. 11.

Subsequently, flow chart 1600 of FIG. 16 includes a step 1630 of providing one or more electrical receptacles at the first exterior surface of the casing. As an example, the one or more electrical receptacles can be identical or similar to electrical receptacles 145 of FIG. 11.

Next, flow chart 1600 includes a step 1640 of electrically coupling the one or more electrical receptacles to the electrical cable. For example, the coupling of the one or more electrical receptacles to the electrical cable can be identical or similar to the electrical coupling of cable 130 to electrical receptacles 145.

Flow chart 1600 of FIG. 16 continues with a step 1650 of winding at least a portion of the electrical cable around a first portion of the casing. As an example, a portion of the cable wound around a first portion of the casing can be identical or similar to the portion of cable 130 wound around tube section 316 as illustrated in FIG. 13.

Flow chart 1600 of FIG. 16 continues with a step 1660 of providing a first light emitting device. The first light emitting device can be identical or similar to light emitting device 1180 as illustrated in FIGS. 11 and 13-14.

Subsequently, flow chart 1600 of FIG. 16 includes a step 1670 of electrically couple the first light emitting device to the electrical cable. For example, the first light emitting device coupled to the electrical cable can be similar or identical to the coupling light emitting device 1180 to cable 130.

Next, flow chart 1600 of FIG. 16 includes a step 1680 of enclose at least a first portion of the first light emitting device in the casing. As an example, the enclosing of the at least a first portion of the first light emitting device in the casing can be identical or similar to the enclosure of light emitting device 1180 in casing 1110 as shown in FIGS. 11 and 13-14.

Flow chart 1600 of FIG. 16 continues with a step 1690 of providing a frame. As an example, the frame can be identical or similar to frame 1120 of FIGS. 11-14 or frame 1520 of FIG. 15.

Subsequently, flow chart 1600 of FIG. 16 includes a step 1695 of coupling the casing to the frame. As an example, the coupling of the casing to the frame can be identical or similar to the coupling of casing 1110 to frame 1120 as shown in FIG. 11 or the coupling of casing 1110 to frame 1520 as shown in FIG. 15.

Figure 17:
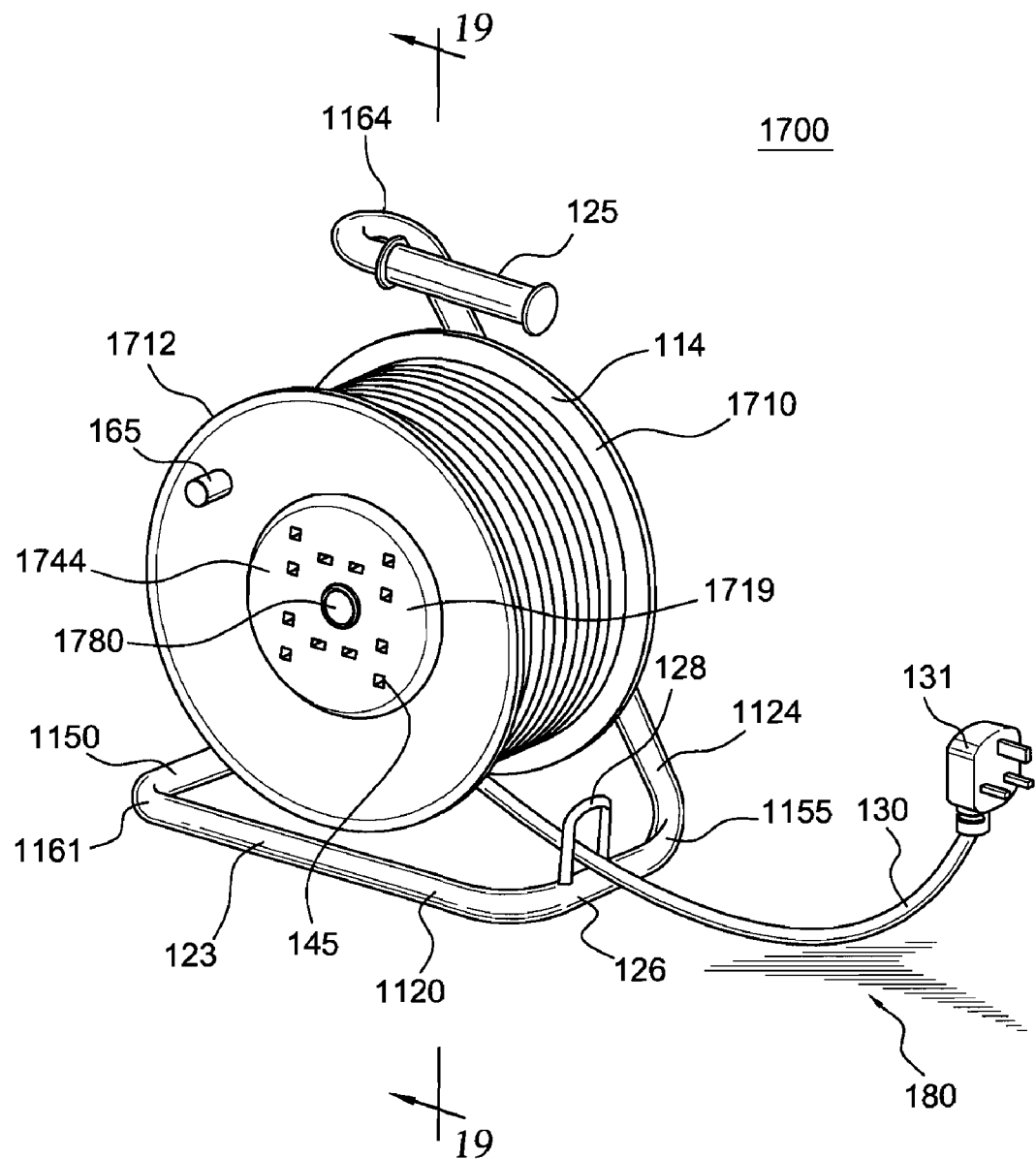
FIG. 17 is a top, left, front isometric view illustrating a cord reel, according to a fifth embodiment.
Figure 18:
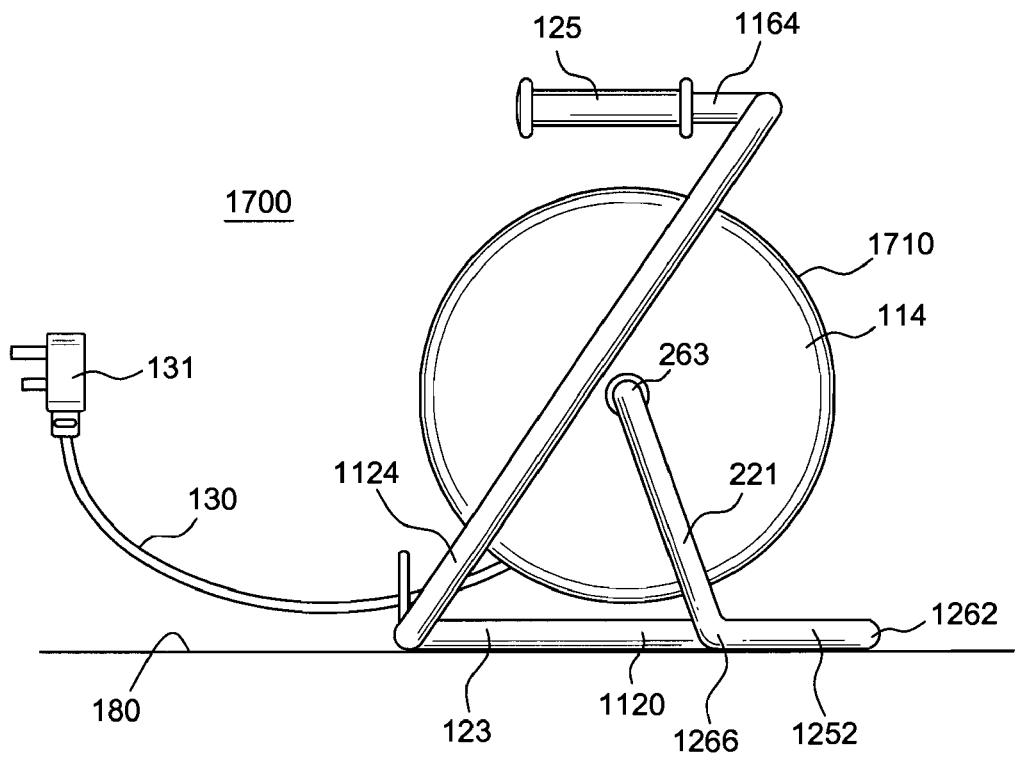
FIG. 18 is a right side view illustrating the cord reel of FIG. 17, according to the fifth embodiment.
Figure 19:
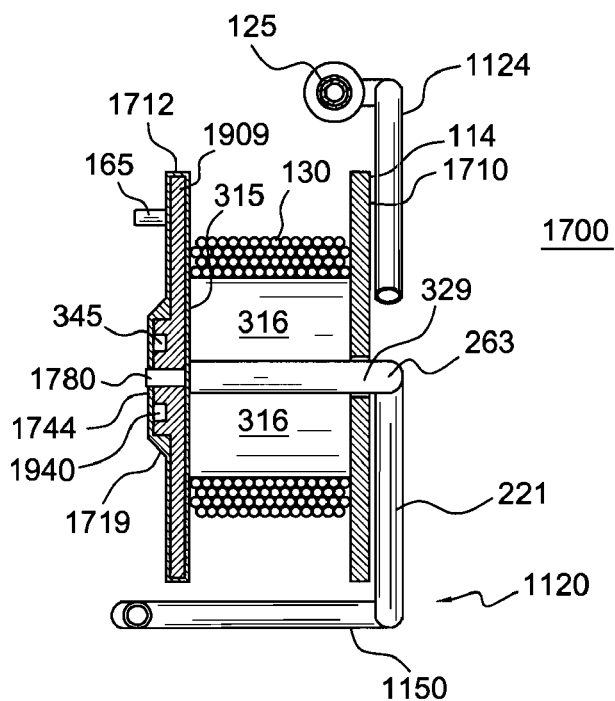
FIG. 19 is a cross-sectional view taken along section lines 19-19 of FIG. 17 illustrating the cord reel of FIG. 17, according to the fifth embodiment.
Figure 20:
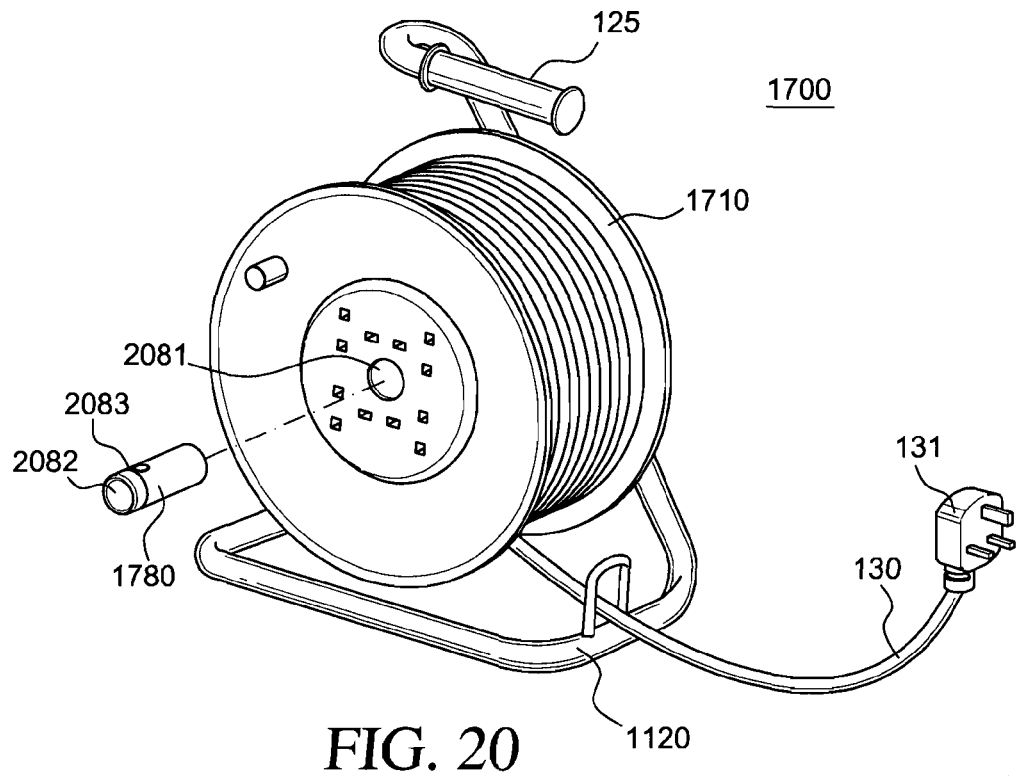
FIG. 20 is a top, front, left isometric view illustrating the cord reel of FIG. 17 with a removable light device removed, according to the fifth embodiment.

FIG. 17 is a top, left, front isometric view illustrating a cord reel 1700, according to a fifth embodiment. FIG. 18 is a right side view illustrating cord reel 1700, according to the fifth embodiment. FIG. 19 is a cross-sectional view taken along section lines 19-19 of FIG. 17 illustrating cord reel 1700, according to the fifth embodiment. FIG. 20 is a top, front, left, isometric view illustrating cord reel 1700 with at least one removable light emitting device 1780 removed, according to the fifth embodiment. It should be understood that cord reel 1700 is merely exemplary and is not limited to the embodiments presented herein. The functional aspects of cord reel 1700 can be employed in many different devices or apparatuses not specifically depicted or otherwise described herein.

Cord reel 1700 can include: (a) a casing 1710; (b) a frame 1120; (c) at least one removable light emitting device 1780; and (d) cable 130 with electrical plug 131. In some embodiments, casing 1710 can include: (a) hub portion 1712; (b) hub portion 114; and (c) tube section 316 (FIG. 19) with end 315 (FIG. 19) and end 317 (FIG. 19) opposite end 315.

In one example, extension section 1719 is radially centered on hub portion 1712 and can include one or more electrical receptacles 145 on an exterior surface 1744. In other embodiments, electrical receptacles 145 can be located at any exterior surface of hub portion 114. Preferably, hub portion 1712 includes at least two electrical receptacles 145. In some embodiments, casing 110 is enclosed in a housing. For example, the housing can be similar to the enclosure of cord reel 1100 (FIG. 11).

Hollow interior section 1909 (FIG. 19) can also partially or completely enclose removable light emitting device 1780 in one embodiment. For example, removable light emitting device 1780 can be a flashlight. Removable light emitting device 1780 can be stored in an aperture 2081 (FIG. 20) in hub portion 1712. In one example, aperture 2081 is located at a center of hub portion 1712. In other embodiments, aperture 2081 can be located at other parts of hub portion 1712. In a yet further embodiment, aperture 2081 can be located at or extend into hub portion 114, tube section 316, and/or frame 1120.

Figure 21:
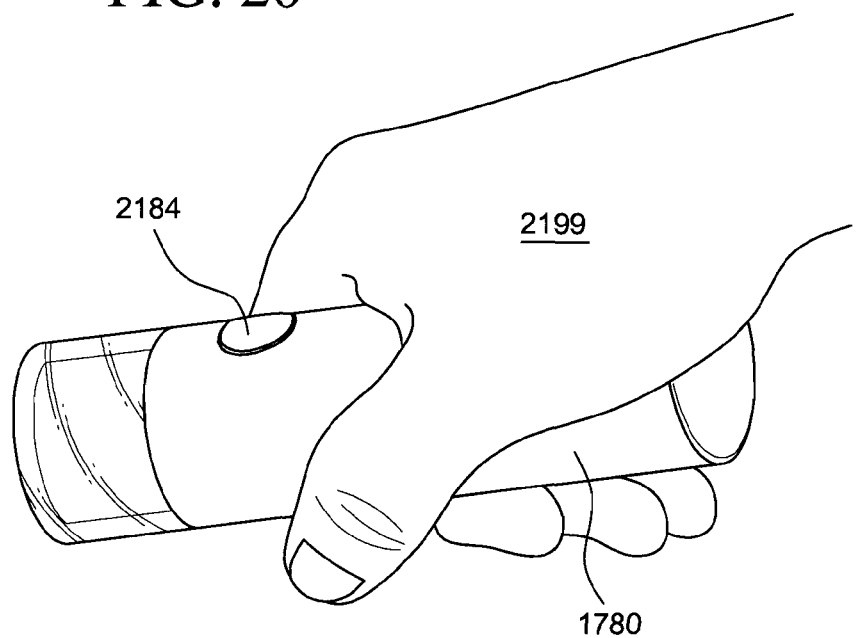
FIG. 21 is a partial top, right isometric view illustrating the removable light device of FIG. 17 being held by a user, according to the fifth embodiment.

FIG. 21 is a partial top, right isometric view illustrating removable light emitting device 1780 being held by a user 890, according to the fifth embodiment. As shown in FIGS. 20 and 21, removable light emitting device 1780 can have the shape of a cylindrical tube with a light 2082 at one end 2083 and a power button 2184 (FIG. 21) on one side. Power for removable light emitting device 1780 can be provided by a battery (not shown) inside of removable light emitting device 1780. In one example, removable light emitting device 1780 includes a rechargeable battery that is charged when cable 130 is coupled to an external power supply (not shown). In the same or a different embodiment, removable light emitting device 1780 includes a replaceable battery.

Electrical power to removable light emitting device 1780 can be provided by cable 130. In one example, hub portion 1712 includes one or more apertures (not illustrated) through which cable 130 is coupled to removable light emitting device 1780 when removable light emitting device is coupled to hub portion 1712.

In other embodiments, hollow interior section 1909 can include one or more electrical components 1940 in addition to removable light emitting device 1780. For example, hollow interior section 1909 can also enclose a clock, a radio, a compact disk player, a light, a security system, a voltmeter, an ammeter, a multimeter, an uninterruptible power supply (UPS), a surge protector, and/or a thermometer. In a further embodiment, a portion of the one or more second electrical components can be enclosed in hub portion 114, tube section 316, and/or frame 120.

In some embodiments, the one or more electrical components can include a rechargeable battery (not shown). The rechargeable battery can be used to power removable light emitting device 1780 and/or any electrical devices (not illustrated) electrically coupled to electrical receptacles 145. The rechargeable battery can be recharged by plugging electrical plug 131 or another electrical plug coupled to the at least one other electrical component (not shown) into an electrical outlet. The rechargeable battery would only provide electrical power to removable light emitting device 1780 when removable light emitting device 1780 is coupled to casing 1710.

Hub section 1712 and/or removable light emitting device 1780 can include a removal mechanism (not shown) to assist in the removal of removable light emitting device 1780 from cord reel 1700. In one embodiment, hub section 1712 includes a spring mechanism (not shown) to eject removable light emitting device 1780 from cord reel 1700. In these embodiments, when a user presses removable light emitting device 1780 towards tube section 316, the spring mechanism can pop removable light emitting device 1780 at least partially out of aperture 2081 in cord reel 1700. In another embodiment, hub section 1712 can include a lever mechanism (not shown) to eject removable light emitting device 1780 from cord reel 1700. For example, when a user presses a button on hub section 1712, a lever mechanism within hub section 1712 can push removable light emitting device 1780 out of aperture 2081 in cord reel 1700. In yet another embodiment, removable light emitting device 1780 can include a small tab that a user can pull to eject removable light emitting device 1780 from cord reel 1700.

Figure 22:
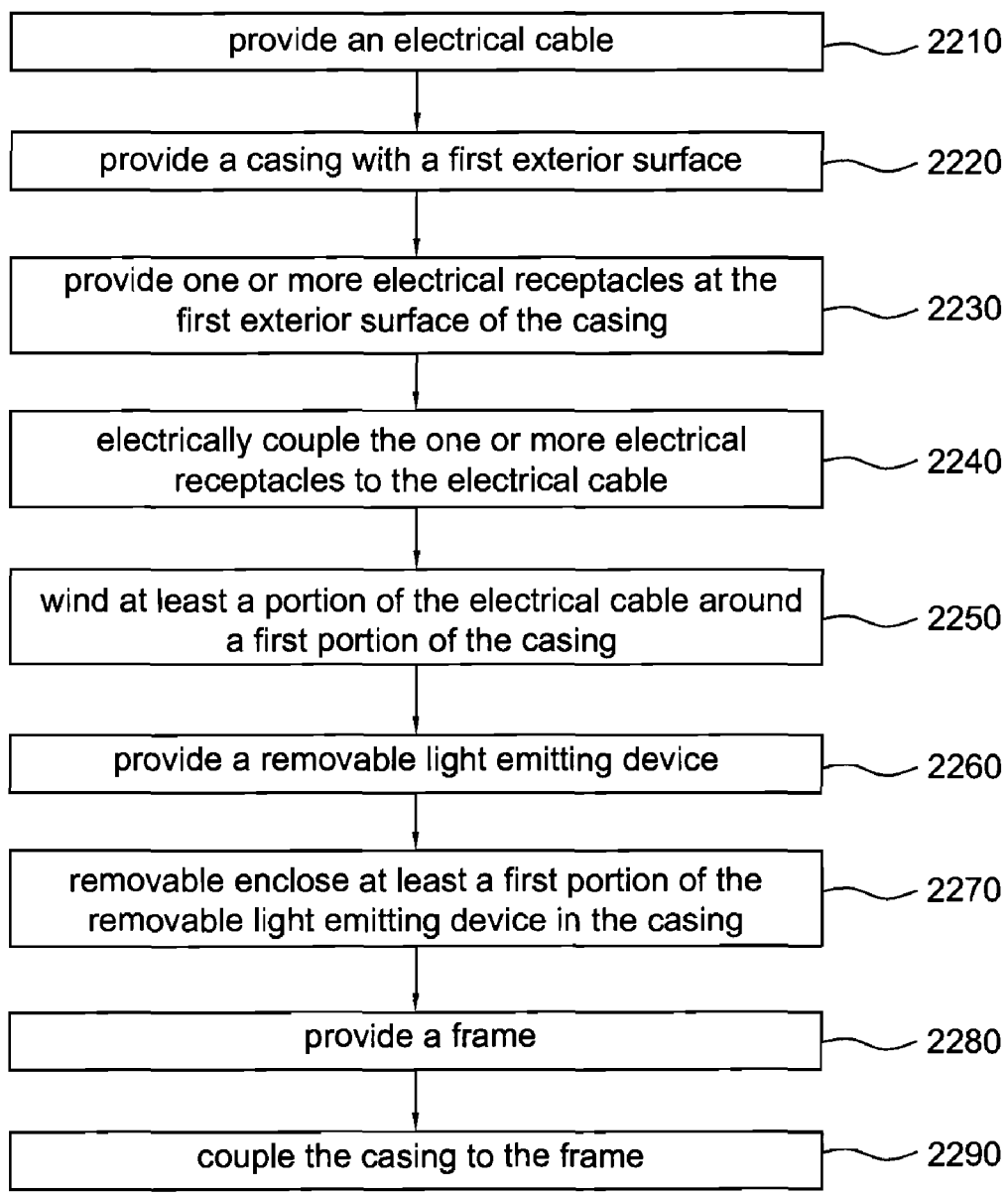
FIG. 22 is a flow chart illustrating another embodiment of a method of manufacturing a cord reel.

FIG. 22 is a flow chart 2200 illustrating an embodiment of a method of manufacturing a cord reel. Flow chart 2200 of FIG. 22 includes a step 2210 of providing an electrical cable. As an example, the cable can be identical or similar to cable 130 of FIG. 17.

Flow chart 2200 of FIG. 22 continues with a step 2220 of providing a casing with a first exterior surface. As an example, the casing and first exterior surface can be identical or similar to casing 1710 and exterior surface 1744, respectively, of FIG. 17.

Subsequently, flow chart 2200 of FIG. 22 includes a step 2230 of providing one or more electrical receptacles at the first exterior surface of the casing. As an example, the one or more electrical receptacles can be identical or similar to electrical receptacles 145 of FIG. 17.

Next, flow chart 2200 includes a step 2240 of electrically coupling the one or more electrical receptacles to the electrical cable. For example, the coupling of the one or more electrical receptacles to the electrical cable can be similar or identical to the coupling of electrical receptacles 145 to cable 130.

Flow chart 2200 of FIG. 22 continues with a step 2250 of winding at least a portion of the electrical cable around a first portion of the casing. As an example, a portion of the cable wound around a first portion of the casing can be identical or similar to the portion of cable 130 wound around tube section 316 as illustrated in FIG. 19.

Flow chart 2200 of FIG. 22 continues with a step 2260 of providing a removable light emitting device. The removable light emitting device can be identical or similar to removable light emitting device 1780 as illustrated in FIGS. 17 and 19-21.

Next, flow chart 2200 includes a step 2270 of removable enclose at least a first portion of the removable light emitting device in the casing. As an example, the removable enclosing of the at least a first portion of the removable light emitting device in the casing can be identical or similar to the removable enclosure of removable light emitting device 1780 in casing 1710 as shown in FIGS. 17 and 19.

Flow chart 2200 of FIG. 22 continues with a step 2280 of providing a frame. As an example, the frame can be identical or similar to frame 1120 of FIGS. 17-20 or frame 1520 of FIG. 15.

Subsequently, flow chart 2200 of FIG. 22 includes a step 2290 of coupling the casing to the frame. As an example, the coupling of the casing to the frame can be identical or similar to the coupling of casing 1710 to frame 1120 as shown in FIGS. 17-20.

Figure 23:
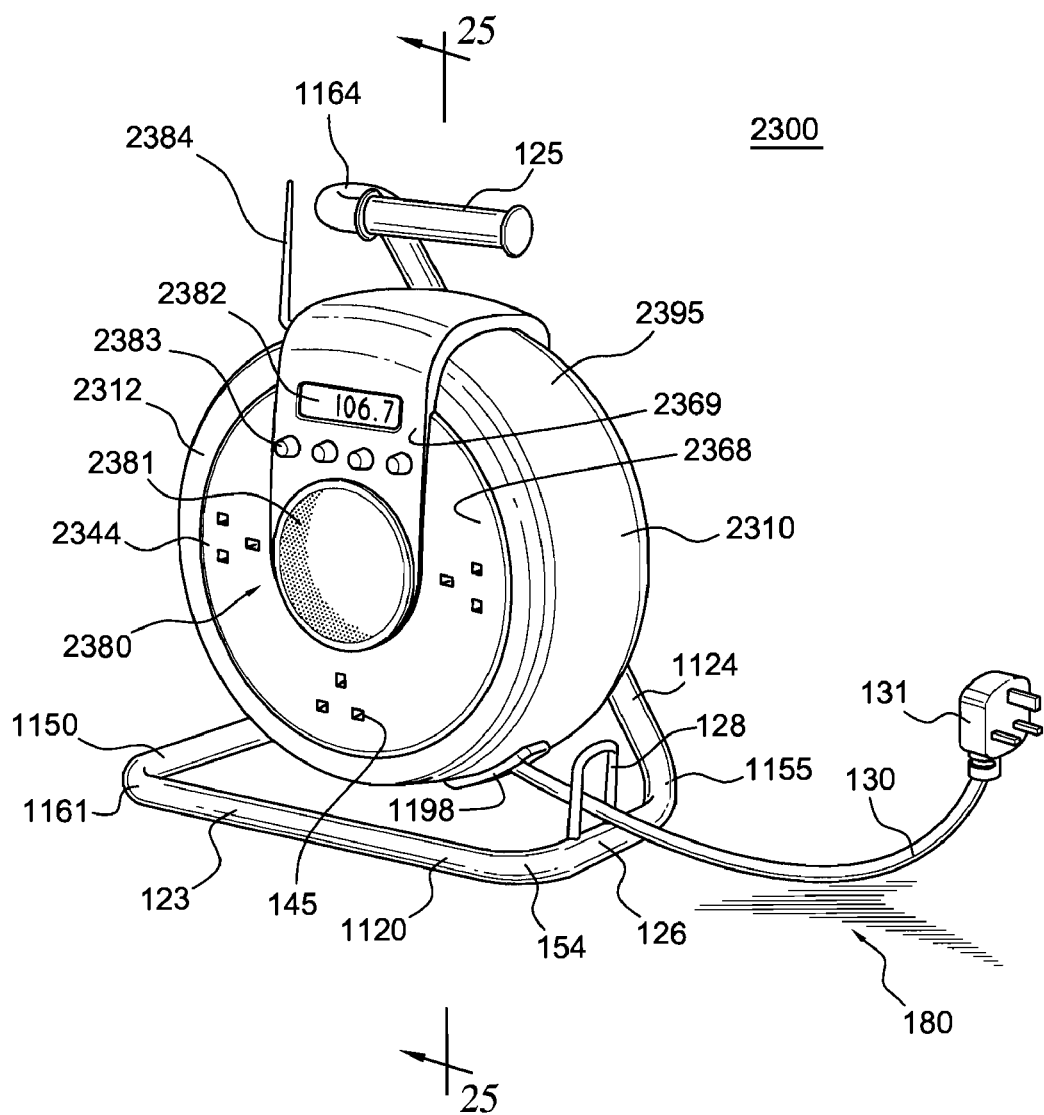
FIG. 23 is a top, front, left isometric view illustrating a cord reel, according to a sixth embodiment.
Figure 24:
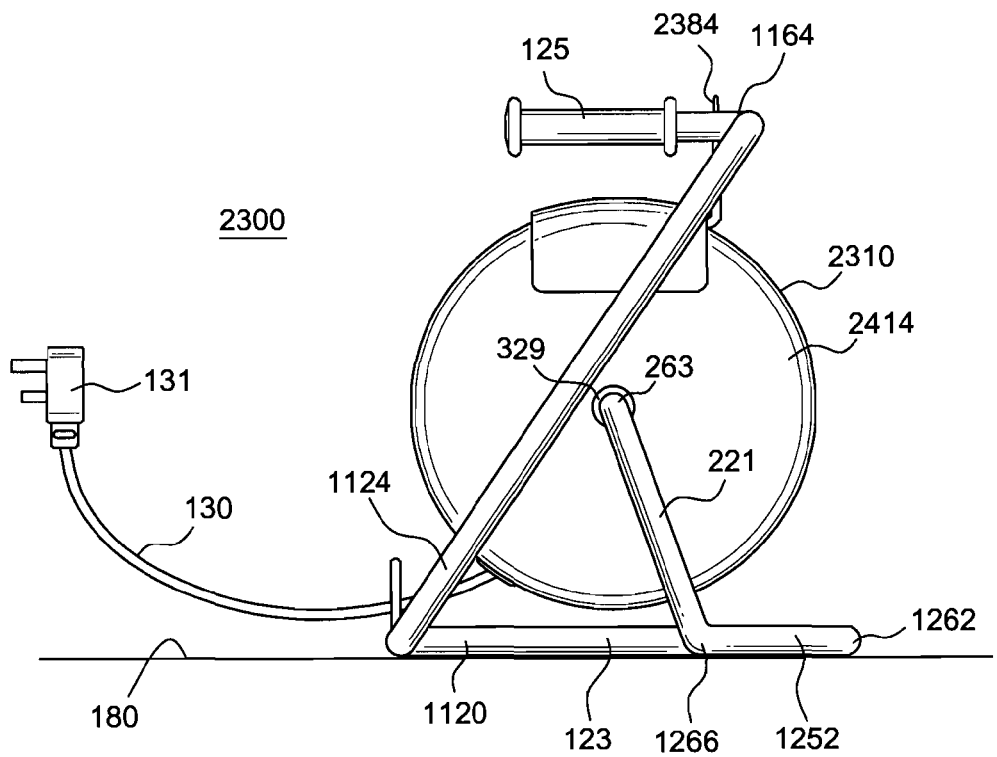
FIG. 24 is a right side view illustrating the cord reel of FIG. 23, according to the sixth embodiment.
Figure 25:
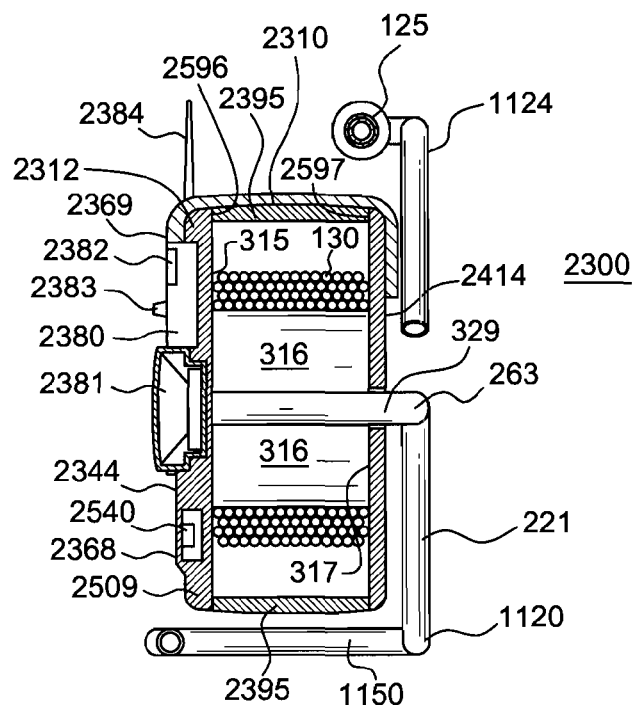
FIG. 25 is a cross-sectional view taken along section lines 25-25 of FIG. 23 illustrating the cord reel of FIG. 23, according to the sixth embodiment.
Figure 26:
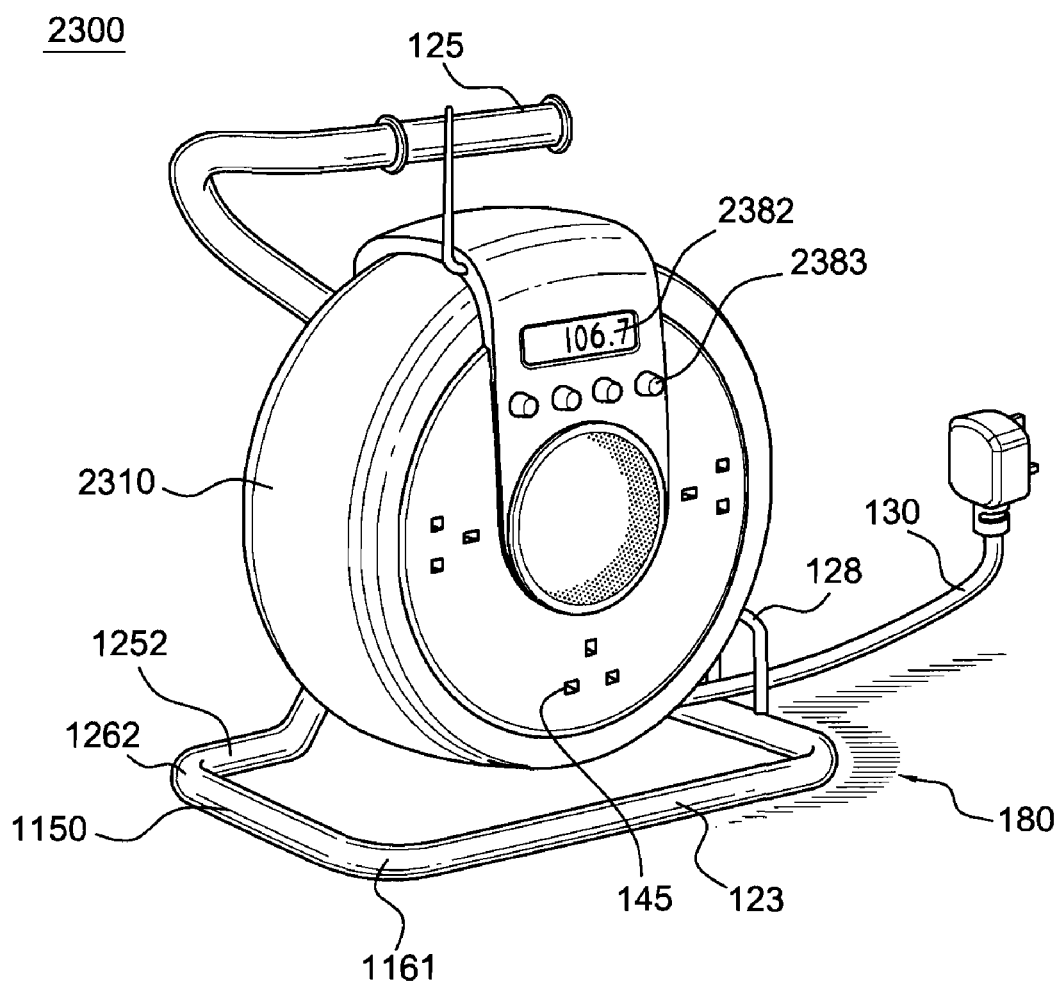
FIG. 26 is a top, back, left isometric view illustrating the cord reel of FIG. 23, according to the sixth embodiment.

FIG. 23 is a top, front, left isometric view illustrating a cord reel 2300, according to a sixth embodiment. FIG. 24 is a right side view illustrating cord reel 2300, according to the sixth embodiment. FIG. 25 is a cross-sectional view taken along section lines 25-25 of FIG. 23 illustrating cord reel 2300, according to the sixth embodiment. FIG. 26 is a top, back, left isometric view illustrating cord reel 2300, according to the sixth embodiment. It should be understood that cord reel 2300 is merely exemplary and is not limited to the embodiments presented herein. The functional aspects of cord reel 2300 can be employed in many different devices or apparatuses not specifically depicted or otherwise described herein.

Cord reel 2300 can include: (a) a casing 2310; (b) a frame 1120; (c) a radio 2380; and (d) cable 130 with electrical plug 131. In some embodiments, casing 2310 can include: (a) hub portion 2312; (b) hub portion 2414 (FIG. 24); (c) tube section 316 (FIG. 25) with end 315 (FIG. 25) and end 317 (FIG. 25) opposite end 315; and (d) a housing 2395.

A center section of hub portion 2312 can be coupled to end 315 of tube section 316, and a center section of hub portion 2414 can be coupled to end 317 of tube section 316. In one example, tube section 316 is enclosed by housing 2395 and hub portions 2312 and 2414. Housing 2395 is coupled to an interior end 2596 at a radial edge of hub portion 2312 and to an interior end 2597 at a radial edge of hub portion 2414. In one embodiment, all or a part of housing 2395 can be integrated with hub portion 112 and/or hub portion 114. Housing 2395 includes an opening 1198 to allow cable 130 to exit housing 2395.

In one example, extension section 2368 is radially centered on hub portion 2312 and can include one or more electrical receptacles 145 on an exterior surface 2344. In other embodiments, electrical receptacles 145 can be located on any exterior surface of housing 2395 and/or hub portions 2312 and 2414. Preferably, hub portion 2312 includes at least two electrical receptacles 145.

Hub portion 2312 can also include a hollow interior section 2509 (FIG. 25), which is capable of containing or enclosing partially or entirely at least one electrical component 2540. In other embodiments, electrical component 2540 can be enclosed in hub portion 2414 and/or tube section 316. In the illustrated example, electrical component 2540 comprises an electrical surge protector. Electrical component 2540 can be coupled to electrical receptacles 145.

Hollow interior section 2509 can also partially or completely enclose a radio 2380 in one embodiment. Radio 2380 can include at least one speaker 2381, a display 2382, one or more buttons 2383, and an antenna 2384.

In the illustrated example, speaker 2381 protrudes from the center of hub portion 2312. Display 2382 and buttons 2383 can protrude from the top part of extension section 2369 on hub portion 2312. In other embodiments, speaker 2381, display 2382, and buttons 2383 can be located at extension section 2368, and electrical receptacles 145 can be located at extension section 2369. In yet still another embodiment, speaker 2381, display 2382, buttons 2383, and electrical receptacles 145 can be located on hub portion 2312 and/or housing 2395. In a further embodiment, portions of radio 2380 can be enclosed in hub portion 2414, tube section 316, and/or frame 1120. Radio 2380 also might not be encased in hollow interior section 2509, but can be enclosed by, extend from, or separably attached to housing 2395.

In other embodiments, radio 2380 can include or be replaced by one or more of a compact disk player, a digital audio (MP3) player, a television, a telephone, or a satellite radio. In further embodiments, display 2382 and buttons 2383 can be replace by a touch screen. In some embodiments, cord reel 2300 can include multiple speakers to create stereo or surround sound.

Electrical power to electrical component 2540 and radio 2380 can be provided by cable 130. In one example, hub portion 2312 includes one or more apertures (not illustrated) through which cable 130 is coupled to electrical component 2540 and radio 2380.

In one embodiment, cord reel 2300 includes a rechargeable battery (not shown). The rechargeable battery can be used to power radio 2380 and/or any electrical devices (not illustrated) electrically coupled to electrical receptacles 145. The rechargeable battery can be recharged by plugging electrical plug 131 or another electrical plug coupled to the at least one other electrical component (not shown) into an electrical outlet.

Figure 27:
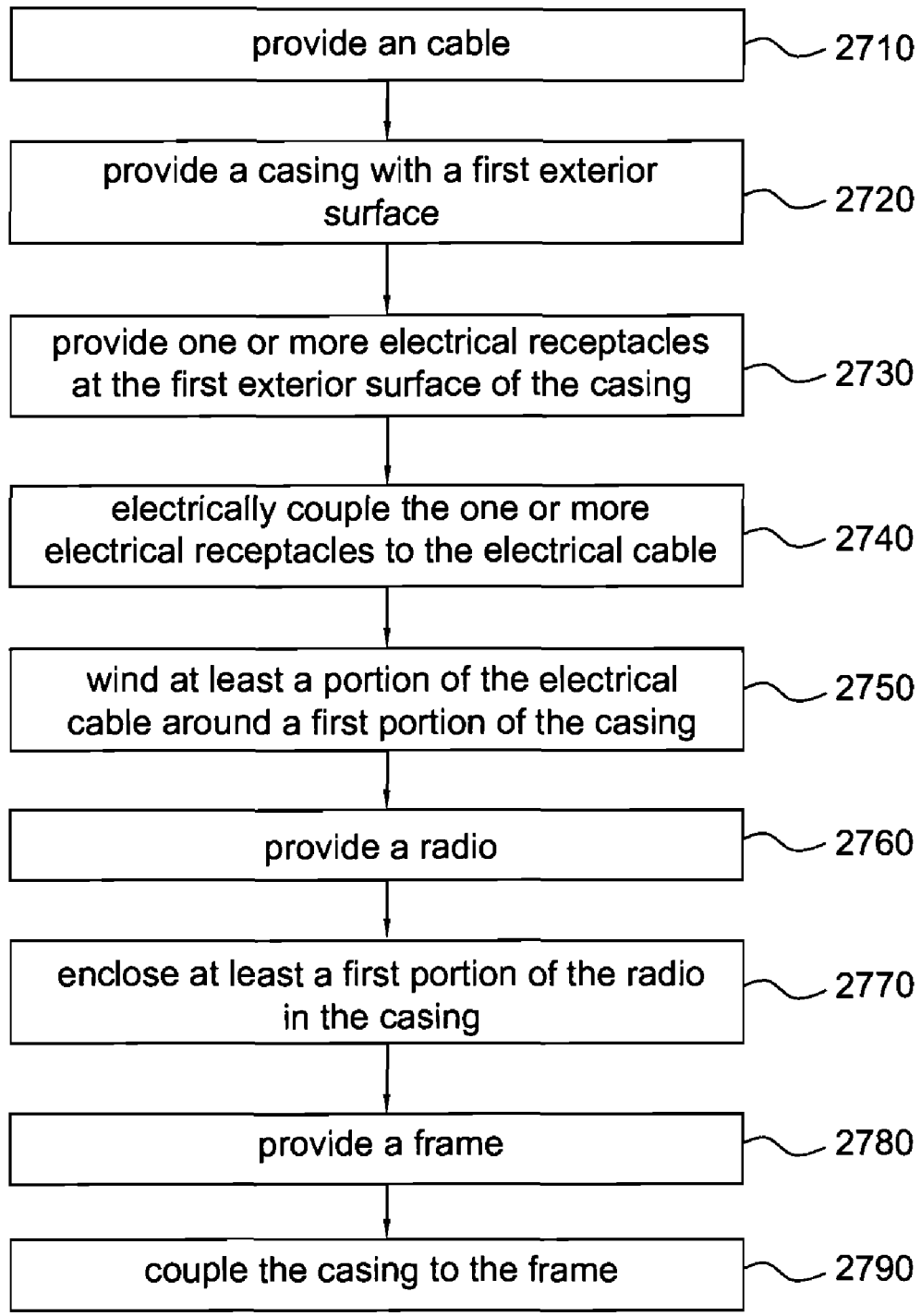
FIG. 27 is a flow chart illustrating a further embodiment of a method of manufacturing a cord reel.

FIG. 27 is a flow chart 2700 illustrating an embodiment of a method of manufacturing a cord reel. Flow chart 2700 of FIG. 27 includes a step 2710 of providing an electrical cable. As an example, the cable can be identical or similar to cable 130 of FIG. 23.

Flow chart 2700 of FIG. 27 continues with a step 2720 of providing a casing with a first exterior surface. As an example, the casing and first exterior surface can be identical or similar to casing 2310 and exterior surface 2344, respectively, of FIG. 23.

Subsequently, flow chart 2700 of FIG. 27 includes a step 2730 of providing one or more electrical receptacles at the first exterior surface of the casing. As an example, the one or more electrical receptacles can be identical or similar to electrical receptacles 145 of FIG. 23.

Next, flow chart 2700 includes a step 2740 of electrically coupling the one or more electrical receptacles to the electrical cable.

Flow chart 2700 of FIG. 27 continues with a step 2750 of winding at least a portion of the electrical cable around a first portion of the casing. As an example, a portion of the cable wound around a first portion of the casing can be identical or similar to the portion of cable 130 wound around tube section 316 as illustrated in FIG. 25.

Flow chart 2700 of FIG. 27 continues with a step 2760 of providing a radio. The radio can be identical or similar to radio 2380 as illustrated in FIG. 23.

Next, flow chart 2700 includes a step 2770 of enclose at least a first portion of the radio in the casing. As an example, the enclosing of the at least a first portion of the radio in the casing can be identical or similar to the enclosure of radio 2380 in casing 2310 as shown in FIGS. 23-26.

Flow chart 2700 of FIG. 27 continues with a step 2780 of providing a frame. As an example, the frame can be identical or similar to frame 1120 of FIGS. 23-26 form frame 1520 of FIG. 15.

Subsequently, flow chart 2700 of FIG. 27 includes a step 2790 of coupling the casing to the frame. As an example, the coupling of the casing to the frame can be identical or similar to the coupling of casing 2310 to frame 1120 as shown in FIGS. 23-26.

Although the invention has been described with reference to specific embodiments, it will be understood by those skilled in the art that various changes may be made without departing from the spirit or scope of the invention. Examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. To one of ordinary skill in the art, it will be readily apparent that the case and method of use discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A cord reel comprising:
    an electrical cable;
    a casing with a first exterior surface;
    one or more electrical receptacles at the first exterior surface and electrically coupled to the electrical cable; and
    a frame comprising:
        at least one wheel; and
        a body coupled to the at least one wheel and the casing,
    wherein:
    the casing is configured such that at least a portion of the electrical cable can be wound around a first portion of the casing;
    the electrical cable is configured to provide electrical power to the one or more electrical receptacles;
    the body comprises:
        a shaft portion with an end; and
        a handle coupled to the end of the shaft portion;
    a length of the shaft portion can be adjusted between two or more lengths;
    a surge protector located within the casing and electrically coupled between the one or more electrical receptacles and the electrical cable; and a rechargeable battery electrically coupled to the one or more electrical receptacles and the electrical cable, wherein:

the rechargeable battery is configured to provide electrical power to the one or more electrical receptacles when the electrical cable is not electrically coupled to an external power source;

the casing is removably coupled to the frame;

the shaft portion comprises at least two telescoping tubular components;

a first telescoping tubular component of the at least two telescoping tubular components can be axially displaced relative to a second telescoping tubular component of the at least two telescoping tubular components;

the handle is orientated in a direction substantially perpendicular to an axis of the at least one wheel;

the first telescoping tubular component of the at least two telescoping tubular components is coupled to the handle; and the frame is configured such that when the electrical device is rolled across a surface, the wheels are in contact with the surface and the frame is not in contact with the surface.

2. The cord reel of claim 1, wherein:

the one or more electrical receptacles remain substantially stationary while the electrical cable is wound and unwound onto the first portion of the casing.

3. A cord reel comprising:

an electrical cable;

a first light emitting device electrically coupled to the electrical cable;

a casing with a first exterior surface and enclosing at least a first portion of the first light emitting device;

one or more electrical receptacles at the first exterior surface and electrically coupled to the electrical cable; and a frame coupled to the casing, wherein:

the casing is configured such that at least a portion of the electrical cable can be wound around a first portion of the casing;

the electrical cable is configured to provide electrical power to the one or more electrical receptacles and the first light emitting device;

the first light emitting device is removable from the casing; and the first light emitting device comprises a first battery.

4. The cord reel of claim 3, wherein:

the one or more electrical receptacles remain substantially stationary while the electrical cable is wound and unwound onto the first portion of the casing.

5. The cord reel of claim 3, further comprising:

a second light emitting device, wherein:

the first light emitting device is located at the first exterior surface when the electrical cable provides electrical power to the first light emitting device; and the second light emitting device is located at the first exterior surface of the casing.

6. The cord reel of claim 3, wherein:

the frame comprises:

a first portion of the frame configured to rest on a surface when the casing is at a first orientation with respect to the surface; and a second portion of the frame configured to rest on the surface when the casing is at a second orientation with respect to the surface.

7. The cord reel of claim 3, further comprising:

a surge protector electrically coupled between the one or more electrical receptacles and the electrical cable; and the surge protector is located within the casing.

8. The cord reel of claim 7, wherein:

the frame comprises:

a first portion of the frame configured to rest on a surface when the casing is at a first orientation with respect to the surface; and a second portion of the frame configured to rest on the surface when the casing is at a second orientation with respect to the surface;

the casing encloses the at least the portion of the cable wound around the first portion of the casing;

the casing is configured such that the first portion of the casing can be rotated when the electrical cable is wound around the first portion of the casing.

9. A cord reel comprising:

a cable;

a removable light emitting device;

a casing configured to contain the removable light emitting device; and a frame coupled to the casing, wherein:

the casing is configured such that at least a portion of the electrical cable can be wound around a first portion of the casing;

the cable comprises an electrical cable;

the removable light emitting device comprises a first battery; and the cable is electrically coupled to the removable light emitting device such that the cable provides electrical power to charge the first battery of the removable light emitting device when the removable light emitting device is contained by the casing.

10. The cord reel of claim 9, further comprising:

a removal mechanism configured to assist in detaching the removable light emitting device from the casing.

11. The cord reel of claim 9, further comprising:

an electrical component contained by the casing.

12. The cord reel of claim 11, wherein:

the electrical component comprises at least one electrical receptacle; and the cable is electrically coupled to the at least one electrical receptacle.

13. A cord reel comprising:

a cable;

a removable light emitting device;

a casing configured to contain the removable light emitting device;

an electrical component contained by the casing; and a frame coupled to the casing, wherein:

the casing is configured such that at least a portion of the electrical cable can be wound around a first portion of the casing;

the electrical component comprises at least one electrical receptacle;

the cable is electrically coupled to the at least one electrical receptacle;

the removable light emitting device is a flashlight;

a second portion of the casing encloses the at least the portion of the cable wound around the first portion of the casing;

the cable comprises an electrical cable;

the removable light emitting device comprises a battery;

when the removable light emitting device is contained by the casing, the cable can be electrically coupled to the removable light emitting device and provide electrical power to charge the battery of the removable light emitting device;

the frame comprises:
   a first portion configured to rest on a surface when the casing is at a first orientation with respect to the surface; and
   a second portion configured to rest on the surface when the casing is at a second orientation with respect to the surface;

the casing includes an opening configured to hold the removable light emitting device; and the opening is located at a center of an external surface of the casing.

14. The cord reel of claim 3, wherein:
the first battery is rechargeable; and
the first battery is configured to provide electrical power to the first light emitting device when the electrical cable is not electrically coupled to the first light emitting device.

15. The cord reel of claim 3, further comprising:
a removal mechanism configured to assist in detaching the first light emitting device from the casing.

16. The cord reel of claim 3, further comprising:
one or more electrical components contained by the casing.

17. The cord reel of claim 3, wherein:
the casing includes an opening configured to hold the first light emitting device; and
the opening is located at the first exterior surface of the casing.

18. The cord reel of claim 3, further comprising:
a rechargeable battery electrically coupled to the electrical cable,
wherein:
   the electrical cable is configured to couple to an external power source to provide electrical power to the first light emitting device when the first light emitting device is coupled to the casing; and
   the electrical cable is configured to couple to the external power source to further provide electrical power to the rechargeable battery.

19. The cord reel of claim 18, wherein:
the rechargeable battery is configured to provide electrical power to the first light emitting device when the first light emitting device is coupled to the casing and the electrical cable is not coupled to the external power source.

20. The cord reel of claim 18, wherein:
the rechargeable battery is configured to provide electrical power to the at least one electrical receptacle when the electrical cable is not coupled to the electrical power source.

21. The cord reel of claim 9, wherein:
the first battery is rechargeable; and
the first battery is configured to provide electrical power to the removable emitting device when the electrical cable is not electrically coupled to the removable light emitting device.

22. The cord reel of claim 9, wherein:
the casing includes an opening configured to hold the removable light emitting device; and
the opening is located at an external surface of the casing.

23. The cord reel of claim 9, wherein:
the frame comprises:
   a first portion configured to rest on a surface when the casing is at a first orientation with respect to the surface; and
   a second portion configured to rest on the surface when the casing is at a second orientation with respect to the surface.

24. The cord reel of claim 9, wherein:
the first battery is coupled to the cable such that the first battery is charged when the cable is coupled to an external power supply.

25. The cord reel of claim 9, further comprising:
a rechargeable battery electrically coupled to the cable, wherein:
   the cable is configured to couple to an external power source to provide electrical power to the removable light emitting device when the removable light emitting device is coupled to the casing; and
   the cable is configured to couple to the external power source to further provide electrical power to the rechargeable battery.

26. The cord reel of claim 25, wherein:
the rechargeable battery is configured to provide electrical power to the removable light emitting device when the removable light emitting device is coupled to the casing and the cable is not coupled to the external power source.

27. The cord reel of claim 12, further comprising:
a surge protector electrically coupled between the at least one electrical receptacles and the cable, the surge protector is located within the casing.

* * * * *